(12) United States Patent
Sheppard et al.

(10) Patent No.: US 11,276,073 B2
(45) Date of Patent: Mar. 15, 2022

(54) METHODS AND APPARATUS TO REDUCE COMPUTER-GENERATED ERRORS IN COMPUTER-GENERATED AUDIENCE MEASUREMENT DATA

(71) Applicant: The Nielsen Company (US), LLC, New York, NY (US)

(72) Inventors: Michael Sheppard, Holland, MI (US); PengFei Yi, Shanghai (CN); Ludo Daemen, Duffel (BE)

(73) Assignee: The Nielsen Company (US), LLC, New York, NY (US)

( * ) Notice: Subject to any disclaimer, the term of this patent is extended or adjusted under 35 U.S.C. 154(b) by 709 days.

(21) Appl. No.: 16/224,322

(22) Filed: Dec. 18, 2018

(65) Prior Publication Data

US 2020/0167808 A1    May 28, 2020

Related U.S. Application Data

(63) Continuation of application No. PCT/CN2018/116924, filed on Nov. 22, 2018.

(51) Int. Cl.
*G06Q 30/02* (2012.01)
*G06F 17/18* (2006.01)
(Continued)

(52) U.S. Cl.
CPC ..... *G06Q 30/0204* (2013.01); *G06F 11/0778* (2013.01); *G06F 17/16* (2013.01);
(Continued)

(58) Field of Classification Search
CPC ........... G06Q 30/0201; G06Q 30/0204; H04N 21/44204
See application file for complete search history.

(56) References Cited

U.S. PATENT DOCUMENTS 6,108,637 A    8/2000  Blumenau
6,304,841 B1   10/2001 Berger et al.
(Continued)

FOREIGN PATENT DOCUMENTS

| AU | 2018200997 | 3/2018 |
| CN | 106462858 | 2/2017 |
| WO | 2017118487 | 7/2017 |

OTHER PUBLICATIONS

Patent Cooperation Treaty, "International Search Report," issued in connection with International Patent Application No. PCT/CN2018/116924, dated Aug. 21, 2019, 5 pages.
(Continued)

*Primary Examiner* — Chuong D Ngo
(74) *Attorney, Agent, or Firm* — Hanley, Flight & Zimmerman, LLC

(57) ABSTRACT

An example apparatus includes a matrix processor in circuit with a probability generator to determine a first matrix representative of element-wise multiplication between a constraint matrix and a first transpose matrix of the estimated demographic impression distribution, the constraint matrix based on the reference demographic impression distribution and determine a second matrix by multiplying the first matrix with a second transpose matrix of the constraint matrix. The apparatus further includes an error determiner in circuit with the matrix processor, the error determiner to determine an error indicator value based on the second matrix, the error indicator value indicative of an error associated with the estimated demographic impression distribution, and a probability generator to generate, in response to the error indicator value satisfying a threshold, an accuracy-improved demographic impression distribution.

33 Claims, 11 Drawing Sheets

(51) Int. Cl.
    *G06F 17/16*    (2006.01)
    *G06F 11/07*    (2006.01)
    *G06N 7/06*    (2006.01)
    *G06N 7/04*    (2006.01)

(52) U.S. Cl.
    CPC ......... *G06F 17/18* (2013.01); *G06Q 30/0201* (2013.01); *G06N 7/04* (2013.01); *G06N 7/06* (2013.01)

(56) References Cited

U.S. PATENT DOCUMENTS

| | | |
|---|---|---|
| 8,973,023 B1 | 3/2015 | Rao et al. |
| 10,045,057 B2 | 8/2018 | Shah et al. |
| 10,270,673 B1 | 4/2019 | Sheppard et al. |
| 2008/0183649 A1 | 7/2008 | Farahani et al. |
| 2012/0072469 A1 | 3/2012 | Perez et al. |
| 2013/0145022 A1 | 6/2013 | Srivastava et al. |
| 2014/0280891 A1 | 9/2014 | Doe |
| 2014/0324544 A1 | 10/2014 | Donato et al. |
| 2015/0193813 A1 | 7/2015 | Toupet et al. |
| 2015/0193816 A1 | 7/2015 | Toupet et al. |
| 2015/0262207 A1 | 9/2015 | Rao et al. |
| 2016/0125439 A1 | 5/2016 | Sheppard et al. |
| 2016/0191970 A1 | 6/2016 | Sheppard et al. |
| 2016/0225002 A1 | 8/2016 | Splaine et al. |
| 2016/0379234 A1 | 12/2016 | Shah et al. |
| 2016/0379246 A1 | 12/2016 | Sheppard et al. |
| 2017/0004526 A1 | 1/2017 | Morovati et al. |
| 2017/0006342 A1* | 1/2017 | Nagaraja Rao .. H04N 21/44222 |
| 2017/0061470 A1 | 3/2017 | Sheppard et al. |
| 2017/0091656 A1 | 3/2017 | Sheppard et al. |
| 2017/0091794 A1 | 3/2017 | Sheppard et al. |
| 2017/0118517 A1 | 4/2017 | Sheppard et al. |
| 2017/0161757 A1 | 6/2017 | Zenor et al. |
| 2017/0187478 A1 | 6/2017 | Shah et al. |
| 2017/0251253 A1 | 8/2017 | Sheppard et al. |
| 2018/0227631 A1 | 8/2018 | Singh et al. |
| 2018/0315060 A1 | 11/2018 | Sheppard et al. |

OTHER PUBLICATIONS

International Searching Authority, "Written Opinion," issued in connection with International Patent Application No. PCT/CN2018/116924, dated Aug. 21, 2019, 4 pages.

Gordon, Geoff, "Linear Programming, Lagrange Multipliers, and Duality," [online], [retrieved on Aug. 2, 2018] Retrieved from the Internet:<URL: www.cs.cmu.edu/~ggordon/lp.pdf>, 27 pages.

\* cited by examiner

```
1  function [P, L, wKL] = WeightedKL(C,D,Q,W)
2  % Min sum(w*(p*log(p/q))-p+q)
3  % Subject to C*P=D
4
5  D=D(:);
6  Q=Q(:);
7  W=W(:);
8
9  np=numel(Q);
10 nc=numel(D);
11
12 L=zeros(nc,1);
13 iter=0;
14 tol=10*eps;
15 max_iter=100;
16
17 keepgoing=true;
18
19 while keepgoing
20
21     iter=iter+1;
22     P=evalP(C,Q,L,W);
23     F=C*P-D;
24     J= (bsxfun(@times,C,(P./W)'))*C';
25     delta_L=J\(-F);
26     L=L+delta_L;
27
28     err1=norm(delta_L)/sqrt(nc);
29     if (err1<tol) || (iter>max_iter)
30         keepgoing=false;
31     end
32 end
33
34 P=evalP(C,Q,L,W);
35 wKL=sum(W.*P.*log(P./Q));
36
37
38 end
39
40 function P=evalP(C,Q,L,W)
41 P=Q.*exp(C'*L ./ W) ;
42 end
```

FIG. 6

METHODS AND APPARATUS TO REDUCE COMPUTER-GENERATED ERRORS IN COMPUTER-GENERATED AUDIENCE MEASUREMENT DATA

RELATED APPLICATION

This patent arises from a continuation of PCT Patent Application Serial No. PCT/CN2018/116924, which was filed on Nov. 22, 2018. PCT Patent Application Serial No. PCT/CN2018/116924 is hereby incorporated herein by reference in its entirety. Priority to PCT Patent Application Serial No. PCT/CN2018/116924 is hereby claimed.

FIELD OF THE DISCLOSURE

This disclosure relates generally to audience measurement data, and, more particularly, to methods and apparatus to reduce computer-generated errors in computer-generated audience measurement data.

BACKGROUND

Traditionally, audience measurement entities utilize panel members with known demographics to determine numerous demographic impression distributions across varying websites, channels, viewing sources, media programs, etc. The demographic impression distributions allow a reader to predict the total number of impressions for different websites, channels, viewing sources, media programs, etc., for each demographic. Sometimes the demographic impression distributions include misattributed impressions (e.g., a teenage daughter using her father's Facebook account). Misattributed impressions create discrepancies in the demographic impression distributions determined by the audience measurement entities.

BRIEF DESCRIPTION OF THE DRAWINGS

FIG. 6 is example pseudocode representative of machine readable instructions that may be executed to implement the demographic impression distribution determiner of FIGS. 1-3 and 5 to determine accuracy-improved demographic impression distributions.

The figures are not to scale. In general, the same reference numbers will be used throughout the drawing(s) and accompanying written description to refer to the same or like parts.

DETAILED DESCRIPTION

Figure 1:
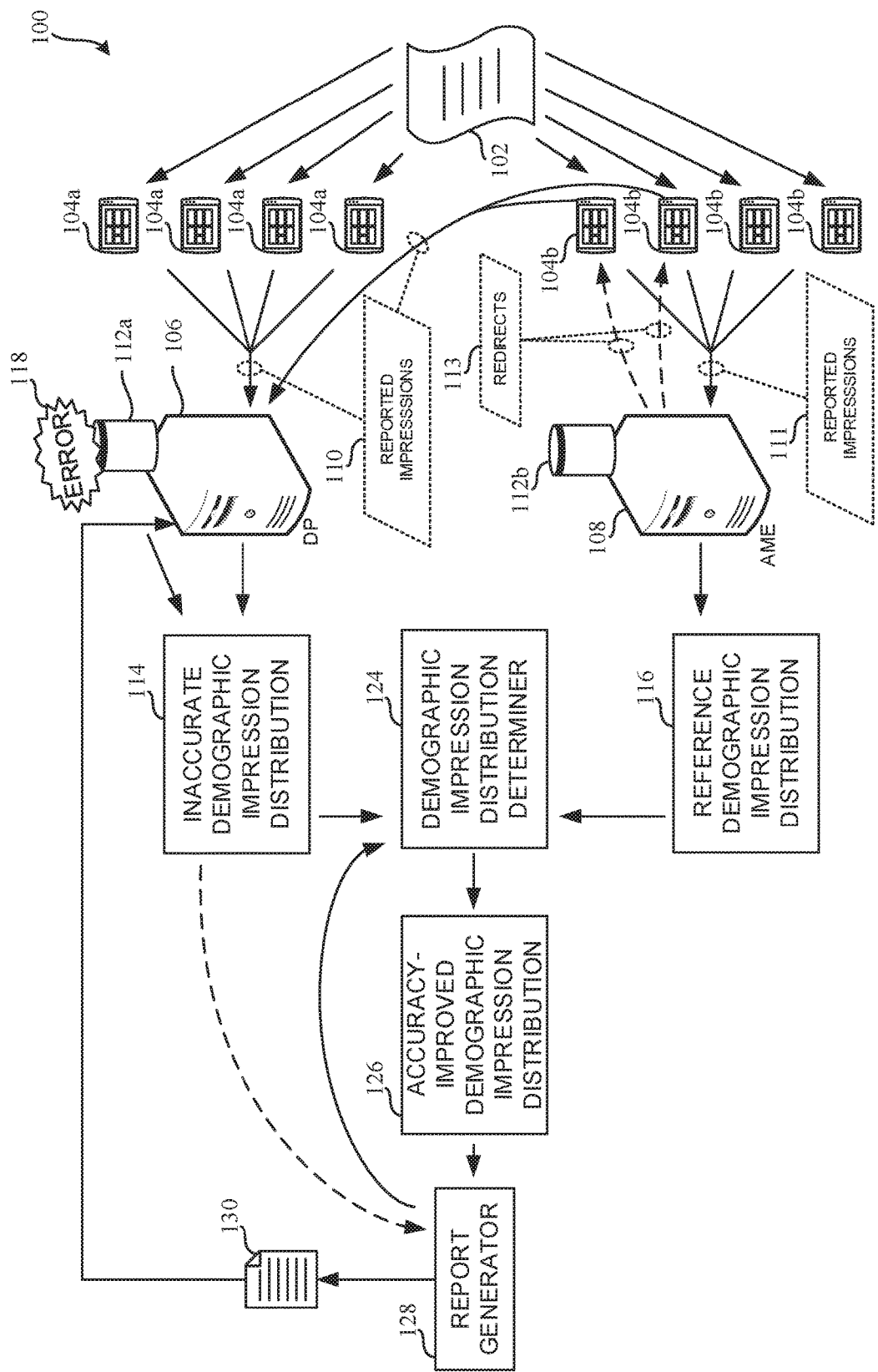
FIG. 1 illustrates an example system for collecting impression data and generating an accuracy improved demographic distribution in accordance with teachings of this disclosure.

Techniques for monitoring user access to Internet resources such as web pages, advertisements and/or other media have evolved significantly over the years. At one point in the past, such monitoring was done primarily through server logs. In particular, entities serving media on the Internet would log the number of requests received for their media at their server. Basing Internet usage research on server logs is problematic for several reasons. For example, server logs can be tampered with either directly or via zombie programs which repeatedly request media from servers to increase the server log counts corresponding to the requested media. Secondly, media is sometimes retrieved once, cached locally and then repeatedly viewed from the local cache without involving the server in the repeat viewings. Server logs cannot track these views of cached media because reproducing locally cached media does not require re-requesting the media from a server. Thus, server logs are susceptible to both over-counting and under-counting errors.

The inventions disclosed in Blumenau, U.S. Pat. No. 6,108,637, fundamentally changed the way Internet monitoring is performed and overcame the limitations of the server side log monitoring techniques described above. For example, Blumenau disclosed a technique wherein Internet media to be tracked is tagged with beacon instructions. In particular, monitoring instructions are associated with the Hypertext Markup Language (HTML) of the media to be tracked. When a client requests the media, both the media and the beacon instructions are downloaded to the client. The beacon instructions are, thus, executed whenever the media is accessed, be it from a server or from a cache. U.S. Pat. No. 6,108,637 is hereby incorporated herein by reference in its entirety.

The beacon instructions cause monitoring data reflecting information about the access to the media to be sent from the client that downloaded the media to a monitoring entity. Typically, the monitoring entity is an audience measurement entity (AME) (e.g., any entity interested in measuring or tracking audience exposures to advertisements, media, and/ or any other media) that did not provide the media to the client and who is a trusted third party for providing accurate usage statistics (e.g., The Nielsen Company, LLC). Advantageously, because the beaconing instructions are associated with the media and executed by the client browser whenever the media is accessed, the monitoring information is provided to the AME irrespective of whether the client is a panelist of the AME.

It is useful, however, to link demographic groups and/or other user information to the monitoring information. To address this issue, the AME establishes a panel of users who have agreed to provide their demographic information and to have their Internet browsing activities monitored. When an individual joins the panel, they provide detailed information concerning their identity and demographic groups (e.g., gender, race, income, home location, occupation, etc.) to the AME. This panelist demographic information is very accurate due to the methods for collection used by the AME such as in-person interviews, telephonic interviews, and/or verification processes to confirm the accuracy of user-provided demographic information. In some examples, the AME may request copies of government-issued. IDs (e.g., driver's license, passport, etc.) or other reliable identifications/documents to identity correct demographics of panelists. The AME sets a cookie on the panelist computer that enables the AME to identify the panelist whenever the panelist accesses tagged media and, thus, sends monitoring information to the AME.

Most of the clients providing monitoring information from the tagged pages are not panelists and, thus, are unknown to the AME. Statistical methods can be used to impute demographic information, based on the data collected for panelists, to the larger population of users providing data for the tagged media. However, panel sizes of AMEs remain small compared to the general population of users. Thus, a problem is presented regarding how to increase panel sizes while ensuring that data of different demographic groups in the panel is accurate.

There are many database proprietors operating on the Internet. These database proprietors provide services (e.g., social networking services, email services, media access services, credit rating services, etc.) to large numbers of subscribers. In exchange for the provision of such services, the subscribers register with the proprietors. As part of this registration, the subscribers provide detailed demographic information. Examples of such database proprietors include social network providers such as Facebook, Myspace, Twitter, etc. These database proprietors set cookies on the computers of their subscribers to enable the database proprietors to recognize registered users when such registered users visit their websites.

Examples disclosed herein can be used to determine media impressions, advertisement impressions, media exposures, and/or advertisement exposures using user information, which is distributed across different databases (e.g., different website owners, service providers, etc.) on the Internet. Not only do example methods, apparatus, and articles of manufacture disclosed herein enable more accurate correlation of Internet media exposure to user information, but they also effectively extend panel sizes and compositions beyond persons participating in the panel of an audience measurement entity and/or a ratings entity to persons registered in other Internet databases such as the databases of wireless service carriers, mobile software/service providers, social medium sites (e.g., Facebook.com® social network service, Twitter.com® social network service, Google.com® Internet service, etc.), and/or any other Internet sites such as Yahoo.com® Internet services, Msn.com® Internet services, Apple.com® Internet services, Experian.com® Internet-based consumer information services, etc. This extension effectively leverages the media impression tracking capabilities of the AME and the use of databases of non-AME entities such as social media and other websites to create an enormous, demographically accurate panel that results in accurate, reliable measurements of exposures to media accessed over the Internet such as advertising and/or programming. Examples of such media include web sites, images presented on web sites, and/or streaming media accessible via a computing device (e.g., Amazon.com/primevideo® Internet media streaming service, Netflix.com® Internet media streaming service, Hulu.com® Internet media streaming service, etc.).

Traditionally, AMEs (also referred to herein as "ratings entities") determine demographic reach for advertising and media programming based on registered panel members. That is, an AME enrolls people that consent to being monitored into a panel. During enrollment, the AME receives demographic information from the enrolling people so that subsequent correlations may be made between advertisement/media exposure to those panelists and different demographic markets. Unlike traditional techniques in which AMEs rely solely on their own panel member data to collect demographics-based audience measurements, example methods, apparatus, and/or articles of manufacture disclosed herein enable an AME to share demographic information with other entities that operate based on user registration models. As used herein, a user registration model is a model in which users subscribe to services of those entities by creating an account and providing demographic-related information about themselves. Sharing of demographic information associated with registered users of database proprietors enables an AME to extend or supplement their panel data with substantially reliable demographics information from external sources (e.g., database proprietors), thus extending the coverage, accuracy, and/or completeness of their demographics-based audience measurements. Such access also enables the AME to monitor persons who would not otherwise have joined an AME panel. Any entity having a database identifying demographics of a set of individuals may cooperate with the AME. Such entities may be referred to as "database proprietors" and include entities such as wireless service carriers, mobile software/service providers, social medium sites (e.g., Facebook.com® social network service, Twitter.com® social network service, Google.com® Internet service, etc.), and/or any other Internet sites such as Yahoo.com® Internet services, Msn.com® Internet services, Apple.com® Internet services, Experian.com® Internet-based consumer information services, etc., that collect demographic data of users which may be in exchange for a service.

Examples disclosed herein may be implemented by an AME (e.g., any entity interested in measuring or tracking audience exposures to advertisements, content, and/or any other media) in cooperation with any number of database proprietors such as online web services providers to develop online media exposure metrics. Such database proprietors/online web services providers may be wireless service carriers, mobile software/service providers, social network sites (e.g., Facebook.com® social network service, Twitter.com® social network service, Google.com® Internet service, etc.) and/or any other Internet sites such as Yahoo.com® Internet service, Msn.com® Internet service, Apple.com® Internet service, Experian.com® Internet-based consumer information service, etc., online retailer sites (e.g., Amazon.com® Internet-based retail service, Buy.com® Internet-based retail service, etc.), and/or any other web service(s) site that maintains user registration records.

The use of demographic information from disparate data sources (e.g., high-quality demographic information from the panels of an audience measurement entity and/or registered user data of web service providers referred to herein as database proprietors) results in improved reporting effectiveness of metrics for both online and offline advertising campaigns. Example techniques disclosed herein use online registration data collected by database proprietors to identify demographics of users, and/or other user information, and use server impression counts, and/or other techniques to track quantities of impressions attributable to those users. Online web service providers such as wireless service carriers, mobile software/service providers, social network sites (e.g., Facebook.com® social network service, Twitter.com® social network service, Google.com® Internet service, etc.), and/or any other Internet sites such as Yahoo.com® Internet service, Msn.com® Internet service, Apple.com® Internet service, Experian.com® Internet-based consumer information service, etc., or online retailer sites (e.g., Amazon.com® Internet-based retail service, Buy.com® Internet-based retail service, etc.), etc., (collectively and individually referred to herein as online database proprietors) maintain detailed demographic information (e.g., age, gender, geographic location, race, income level, education level, religion, etc.) collected via user registration processes. However, such demographics collected by database proprietors can be very inaccurate due to the unmonitored and/or unverified user data collection techniques. Users registering for a service of a database proprietor may omit demographic information and/or provide false information for various reasons. As such, demographic impressions logged by a database proprietor may be inaccurate due to such inaccurate demographic information stored by the database proprietor. An impression corresponds to a home or individual having been exposed to the corresponding media and/or advertisement. A demographic impression is an impression logged in association with demographic information corresponding to an audience member believed to have been exposed to media pertaining to that impression.

Examples disclosed herein use impression information corresponding to tracking of impressions for media accessed by known registered subscribers of one or more database proprietors and by panelists of an audience measurement entity that is separate from the database proprietor. In examples disclosed herein, registered subscribers of a database proprietor are identifiable by the database proprietor when impressions corresponding to those subscribers are reported by a client device with subscriber-identifying information cookies) to the database proprietor. In addition, panelists are identifiable by the AME when impressions corresponding to those panelists are reported to the AME with panelist-identifying information (e.g., AME cookies). In examples disclosed herein, panelist-identifying information is used to collect panelist demographic impressions. Such panelist demographic impressions form a prior impression data set from which constraints are generated for use in determining an accuracy-improved demographic impression distribution of less-accurate impression data logged by database proprietors. However, in other examples, the prior impression data set for use in generating the constraint parameters may instead be based on census-level impressions. In examples disclosed herein, census data corresponds to impressions logged for a general audience in a population regardless of whether the impressions correspond to audience members that are identifiable as registered database proprietor subscribers and/or AME panelists. In examples disclosed herein, census-level impressions are collected as anonymous impression data but in such a way that some demographics gender, age, etc.,) can be determined with relatively better accuracy than database proprietor impressions. For example, census-level impression data may be tagged with corresponding demographics based on, for example, third-party identifiers and/or reliable statistically based assumptions about certain users. In some prior techniques for increasing accuracies of demographic impression measures, a plurality of scaling factors is used along with known data to determine such information. However, under some circumstances scaling factors can give inaccurate results and need to be regularly updated. For example, the inaccurate results arise when a scaled measurement value corresponds to input (e.g., an impression count, a unique audience size, etc.) that is inconsistent with (e.g., not equal to) actual input data (e.g., a measured impression count, a measured unique audience size, etc.). To overcome such inconsistencies, examples disclosed herein use a reference demographic impression distribution to generate an accuracy-improved demographic impression distribution for a database proprietor server.

Examples disclosed herein utilize prior impression count probability distributions to determine a current demographic impression distribution. The prior impression count demographic impression distribution may be a demographic impression distribution obtained from a reliable panel established by the AME. Additionally or alternatively, the prior impression count demographic impression distribution may be a demographic impression distribution obtained from a reliable online web service provider. The prior impression count demographic impression distribution includes reliable panelist demographic information. Examples disclosed herein include updating impression counts obtained from online web service providers. Furthermore, examples disclosed herein include utilizing prior impression count demographic impression distributions to correct inaccurate impression counts collected by online web service providers. Additionally or alternatively, the prior impression count demographic impression distributions may be used to correct inaccurate impression counts obtained by the AME.

Examples disclosed herein include generating demographic impression distributions for impression counts obtained by the AME or online web service providers such as wireless service carriers, mobile software/service providers. In examples disclosed herein, the demographic impression distributions for impression counts obtained by the AME or online web service providers are improved to account for certain demographic constraints (e.g., age, race, gender, etc.).

Examples disclosed herein use prior demographic impression data and constraints to correct inaccurate demographic impression data stored by the database proprietor and/or the AME. In examples disclosed herein, the constraints may define limits in which the accuracy-improved demographic impression distribution should satisfy (e.g., not exceed). The impression data limits (e.g., maximum number of individuals who interacted with a media source) may be determined based on the prior demographic impression data, current demographic knowledge, and/or any combination thereof. Example constraints specify the numerical impression limits for use in modeling the inaccurate demographic impression data. For example, if it is known that 500 total males across all demographic groups visited a website, then the constraints would model the inaccurate demographic impression data so that the sum of a distribution of males across multiple demographics does not exceed a maximum of 500 males accuracy-improved demographic impression distribution cannot determine more than 500 males visiting the website). Additionally, the constraints may be created across different size demographic ranges and/or different sample weights. Examples disclosed herein include correcting inaccurate impression demographic impression data subject to the constraints.

Examples disclosed herein employ a Jacobian Matrix calculation to reduce error in demographic impression data. The Jacobian Matrix is a matrix representative of the amount of transformation performed to a demographic impression distribution. In examples disclosed herein, the Jacobian Matrix is used to numerically solve weighted maximum entropy problems and/or weighted Kullback-Leibler divergence problems. The Jacobian Matrix is used to reduce error in the weighted maximum entropy problems and/or the Kullback-Leibler divergence procedures. Examples disclosed herein user a linear combination of the constraint matrix and the estimated or accuracy-improved demographic impression distribution to generate a Jacobian Matrix.

Examples disclosed herein are not limited to generating accuracy-improved demographic impression distributions for audience members across varying demographic segments. Examples disclosed herein may be used to update inaccurate and/or incorrect estimated probabilities subject to background information, constraints, and/or incorporated weights. For example, inaccurate and/or incorrect probability distributions of total people that visit stores (e.g., restaurants, commercial retail sites, malls, etc.) may be corrected. In such example, the probability is distributed across regions (e.g., cities, states, countries, etc.), the members in the distribution may be people, and the total number of visits (e.g., entering the stores) may be measured. Alternatively, examples disclosed herein may be used to update non-response records to match prior known total response records. In such examples, response records may be a survey of items purchased, therefore, examples disclosed herein may correct probabilities distributed across a number of items purchased for a total number of purchasers. In addition, examples disclosed herein may be used to estimate demographic profiles of households given different regional constraints and known census totals.

Examples disclosed herein may be used to determine a probability distribution across varying demographic profiles. The demographic profiles are mutually exclusive groups that partition a set of individuals, items, places, etc. Examples disclosed herein may have weights for each partition of individuals, items, places, etc., depending on prior known totals of such partition.

FIG. 1 illustrates an example system 100 for collecting impression data and generating an accuracy-improved demographic impression distribution. In the example of FIG. 1, media 102 is accessed by the client devices 104*a*, 104*b*. For example, the client devices 104*a*, 104*b* may access the media 102 via a network (e.g., the Internet) from a server and/or may access the media 102 from local memory. The media 102 may be video, audio, a webpage, an advertisement, programming, content, text, a document, an article, an eBook, and/or any other suitable type of media. Examples disclosed herein are not restricted for use with any particular type of media. On the contrary, examples disclosed herein may be implemented in connection with tracking impressions for media of any type or form in a network.

The example client devices 104*a*, 104*b* are example end user physical devices in which a user may access the media 102. The client devices 104*a*, 104*b* allow the user to interact with the media 102. Example client devices 104*a*, 104*b* include cellular phones, personal computers, laptops, tablets, set top boxes, or any device capable of connecting to the internet. The client devices 104*a* report occurrences of the impressions of the media 102 to the database proprietor server 106. Likewise, the client devices 104*b* also report occurrences of the impressions of the media 102 to the audience measurement entity server 108. The quantity of impression indications 110, 111 are impressions indicative of accesses to the media 102 via the client devices 104*a*, 104*b*.

The example database proprietor server 106 is a computer that logs impressions of media in response to the reported impression indications 110. The database proprietor server 106 is owned by, leased by, operated by, and/or operated on behalf of a database proprietor and stores demographic information about the audience utilizing the client devices 104*a*. For example, when users (e.g., audience members) of the client devices 104*a* subscribe to services of the database proprietor, the users provide demographic information (e.g., age, date of birth, gender, residence city/state, street address, etc.) for account creation purposes to gain access to online services of the database proprietor. The database proprietor server 106 includes an example impression database 112*a*. The impression database 112*a* in the database proprietor server 106 stores and organizes impressions logged in response to the reported impression indications 110 from the client devices 104*a*. The quantity of reported impressions in the reported impression indication 110 include database proprietor identifiers identifiable by the database proprietor server 106. The database proprietor identifiers are identifiers assigned to different ones of the client devices 104*a*. In the illustrated example, the database proprietor identifiers are stored in association with the demographic information of the corresponding subscribers. In some examples disclosed herein, the database proprietor server 106 may be a cloud server, a web server, a game server, a file server, or any other device used to store and/or manage information.

The example audience measurement entity server 108 is a computer that logs impressions in response to reported impression indications 111 from client devices 104*b*. The audience measurement entity server 108 is owned by, leased by, operated by, and/or operated on behalf of an AME that performs audience measurements for understanding exposures to media. An example AME is The Nielsen Company (US) LLC. The audience measurement entity server 108 includes an example impression database 112*b*. The impression database 112*b* in the audience measurement entity server 108 stores and organizes impressions logged in response to the reported impression indications 111 from the client devices 104*b*. The quantity of impressions (e.g., the quantity of reported impression indications 111) includes impressions based on known audience members utilizing the client devices 104*b* and their corresponding audience member demographics. The reported impression indications 111 include audience measurement entity identifiers identifiable by the audience measurement entity server 108. For example, users of the client devices 104*b* that are known to the audience measurement entity server 108 are users that have enrolled in a panel of the AME. During such enrollment, a user provides highly accurate demographics to the AME and consents to the AME accessing an identifier (e.g., a cookie identifier or a non-cookie identifier) on the user's client device 104*b*. In this manner, when the audience measurement entity server 108 receives a reported impression indication 111 from the client device 104b, the audience measurement entity server 108 can log an impression in association with demographic information corresponding to the user of the client device 104b. The example audience measurement entity server 108 may be a cloud server, a web server, a game server, a file server, and/or any other device used to store and/or manage information.

Since the demographic information collected and stored by the audience measurement entity server 108 corresponds to a small quantity of users (e.g., 100-500 users) relative to the large subscriber base of the database proprietor (e.g., millions of users), the AME server 108 redirects the client devices 104b to the database proprietor server 106. In this manner, any reported impression indications that do not have an AME identifier that the AME server 106 can use to identify a user will be recorded at the database proprietor server 106 in association with demographics at the database proprietor server 106 based on a database proprietor identifier stored in the client device 104b. In the example of FIG. 1, such redirects are accomplished using example redirects 113 initiated by the audience measurement entity server 108. Example redirects 113 instruct the client devices 104b to send reported impression indications to the database proprietor server 106. In the example depicted in FIG. 1, the redirect 113 causes a client device 104b to allow the database proprietor server 106 to log demographic impressions if the client device 104b corresponds to a registered subscriber of the database proprietor server 106.

Impression data stored and/or managed by the database proprietor server 106 corresponds to impressions reported by the client devices 104a and/or 104b. In examples disclosed herein, the impression data corresponding to media 102 on the client devices 104b and logged by the AME server 108 for known client devices is trusted impression data. Trusted impression data includes logged impressions that correspond to a known group of users (e.g., panelists of the AME). The impression data corresponding to accesses of media 102 on ones of the client devices 104a, 104b for which the database proprietor server 106 logs impressions may be incorrect as indicated in FIG. 1 by an error 118 generated by the database proprietor server 106. That is, although the database proprietor correlates demographics from subscribers, the collection method involves a website interface that is unmonitored for the purposes of verifying user input data. As such, a user may intentionally or unintentionally provide inaccurate demographic data to the database proprietor. Therefore, the AME server 108 logs and stores trusted (e.g., accurate) impression data from ones of the client devices 104a and the database proprietor server 106 logs and stores inaccurate and/or unknown impression data from the client devices 104b affected by the error 118.

The database proprietor server 106 generates an example inaccurate demographic impression distribution 114. The inaccurate demographic impression distribution 114 is an estimated impression distribution for the impressions logged for the client devices 104a, 104b. The inaccurate demographic impression distribution 114 may be generated in the form of a matrix, an array, a list, a sequence of numbers, or any other data structure to represent distributions. The inaccurate demographic impression distribution 114 includes estimated probabilities of a demographic distribution (e.g., age, gender, race, etc.) of users accessing the media 102 via the client devices 104a, 104b. However, the inaccurate demographic impression distribution 114 is inaccurate due to the error 118 generated by the database proprietor server 106. The inaccurate demographic impression distribution 114 is representative of impression counts distributed across different demographic segments.

The audience measurement entity server 108 generates an example reference demographic impression distribution 116. The reference demographic impression distribution 116 is a reference impression distribution for the impression data obtained from the client devices 104b. The reference demographic impression distribution 116 may be generated in the form of a matrix, an array, a list, a sequence of numbers, or any other data structure for representation distributions. The reference demographic impression distribution 116 is generated based on trusted probabilities of a demographic distribution (e.g., age, gender, race, etc.) of the users that access the media 102 based on ones of the client devices 104b identifiable or known to the AME server 108. That is, the example reference demographic impression distribution 116 is based on ones of the reported impressions 111 corresponding to the first client devices 104b and demographic impression counts stored in the audience measurement entity server 108. The reference demographic impression distribution 116 is representative of reference impression counts distributed across different demographic segments.

The example demographic impression distributions (e.g., the inaccurate demographic impression distribution 114 and/or the reference demographic impression distribution 116) are distributions of probabilities that users accessing the media 102 correspond to different demographic segments. For example, a demographic impression distribution may include data representing the demographic impressions of females aged thirty to thirty-five who accessed the media 102. More specifically, the demographic impression distributions (e.g., the inaccurate demographic impression distribution 114 and/or the reference demographic impression distribution 116) include distributions of the probabilities that different demographics (e.g., age, gender, race, etc.) of users accessed the media 102. The reference demographic impression distribution 116 includes a trusted distribution of the probabilities that the different demographics (e.g., age, gender, race, etc.) of users accessed the media 102. In examples disclosed herein, the reference demographic impression distribution 116 is generated by the audience measurement entity server 108 or another computer of the audience measurement entity server 108 based on logged demographic impressions stored in the trusted impression database 112b. Additionally, in examples disclosed herein, the inaccurate demographic impression distribution 116 is generated by the database proprietor server 106 or another computer of the database proprietor based on impressions logged by the database proprietor server 106 and affected by the error 118.

In examples disclosed herein, the example error 118 results from inaccuracies of demographic information submitted by subscribers and stored by the database proprietor server 106 and/or results from misattributed impression data. A misattributed impression occurs when an impression is incorrectly logged by the database proprietor server 106 as corresponding to one demographic segment when it correctly corresponds to another demographic segment. Such error 118 may result from inaccurate demographic information about a subscriber being stored by the database proprietor server 108 and/or may result from a non-registered or non-logged in user using a client device 104a when another user of a different demographic segment is logged into a service of the database proprietor on the client device (e.g., a teenage male accessing the media 102 on a client device 104a registered and/or logged into by an adult male).

The example demographic impression distribution determiner 124 obtains the inaccurate demographic impression distribution 114, the reference demographic impression distribution 116, and the constraints 122. The demographic impression distribution determiner 124 determines the example accuracy-improved demographic impression distribution 126 with respect to the inaccurate demographic impression distribution 114, the reference demographic impression distribution 116, and the constraints 122. In examples disclosed herein, the demographic impression distribution determiner 124 operates to create an updated demographic impression distribution that corrects the error 118 (e.g., corrects the inaccuracies and/or unknowns associated with the inaccurate demographic impression distribution 114. The demographic impression distribution determiner 124 may communicate the accuracy-improved demographic impression distribution 126 to the example report generator 128. The example accuracy-improved demographic impression distribution 126 is generated by the demographic impression distribution determiner 124 to satisfy the constraints 122 such that the accuracy-improved demographic impression distribution 126 has a similar distribution of demographic impressions for media as the reference demographic impression distribution 116 but based on a larger number of impressions and a larger audience than the reference demographic impression distribution 116.

In some examples, the example report generator 128 generates a report 130 for the database proprietor server 106. The example report 130 is a more accurate, updated demographic impression distribution of the inaccurate demographic impression distribution 114. The example report generator 128 sends the report 130 to the database proprietor server 106 to update and/or replace the existing inaccurate demographic impression distribution 114. In some examples, the report generator 128 communicates with the demographic impression distribution determiner 124 to inform the demographic impression distribution determiner 124 of the generated report 130 to update the inaccurate demographic impression distribution based on the generated report 130. In other examples, the report generator 128 obtains the inaccurate demographic impression distribution 114 to determine the achieved improvements of the accuracy-improved demographic impression distribution 126 relative to the inaccurate demographic impression distribution 114 and logs an improved accuracy percentage in the generated report 130 for the accuracy-improved demographic impression distribution 126.

Figure 2:
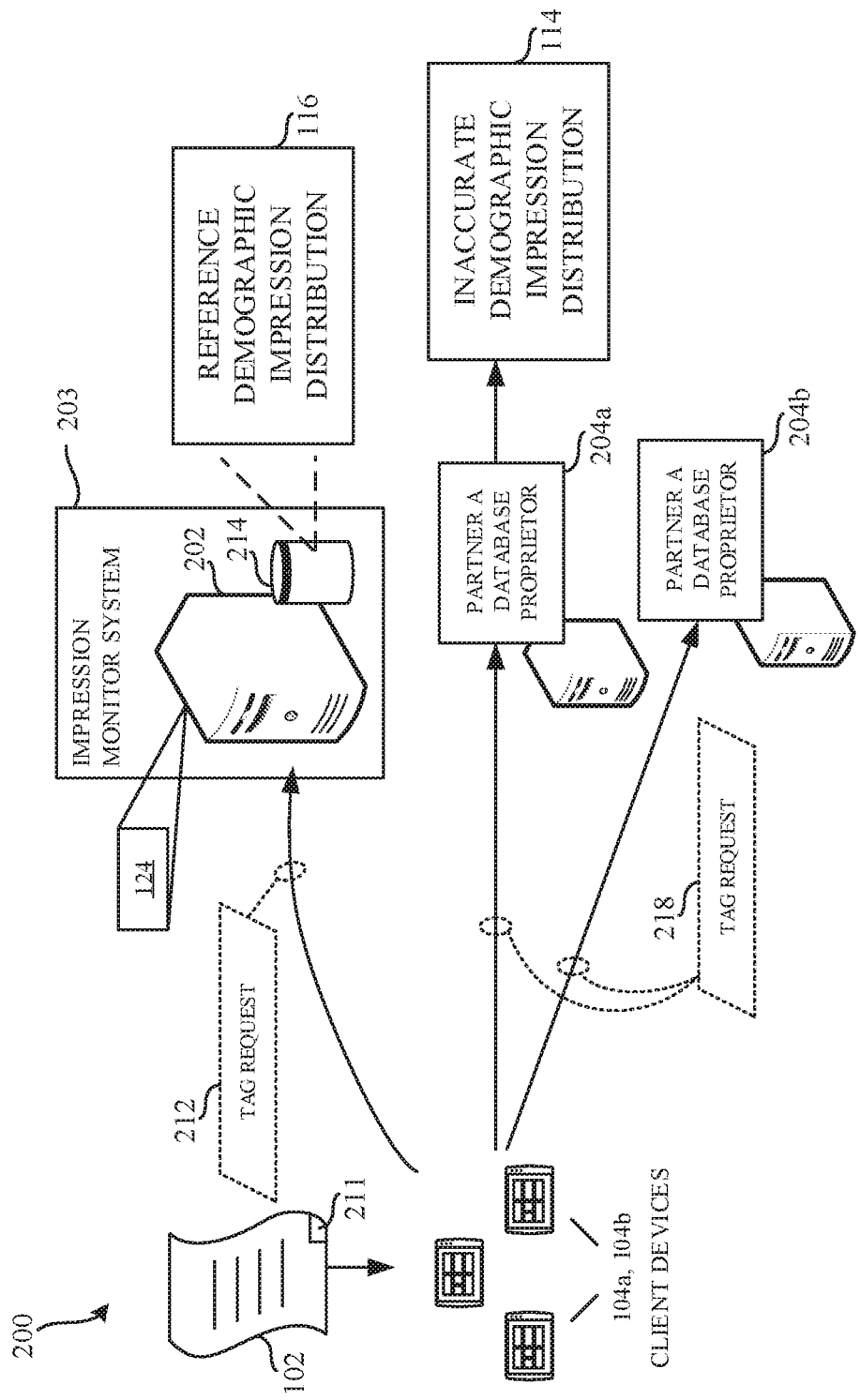
FIG. 2 shows an example operating environment for logging impressions reported by client devices across the Internet.
Figure 3:
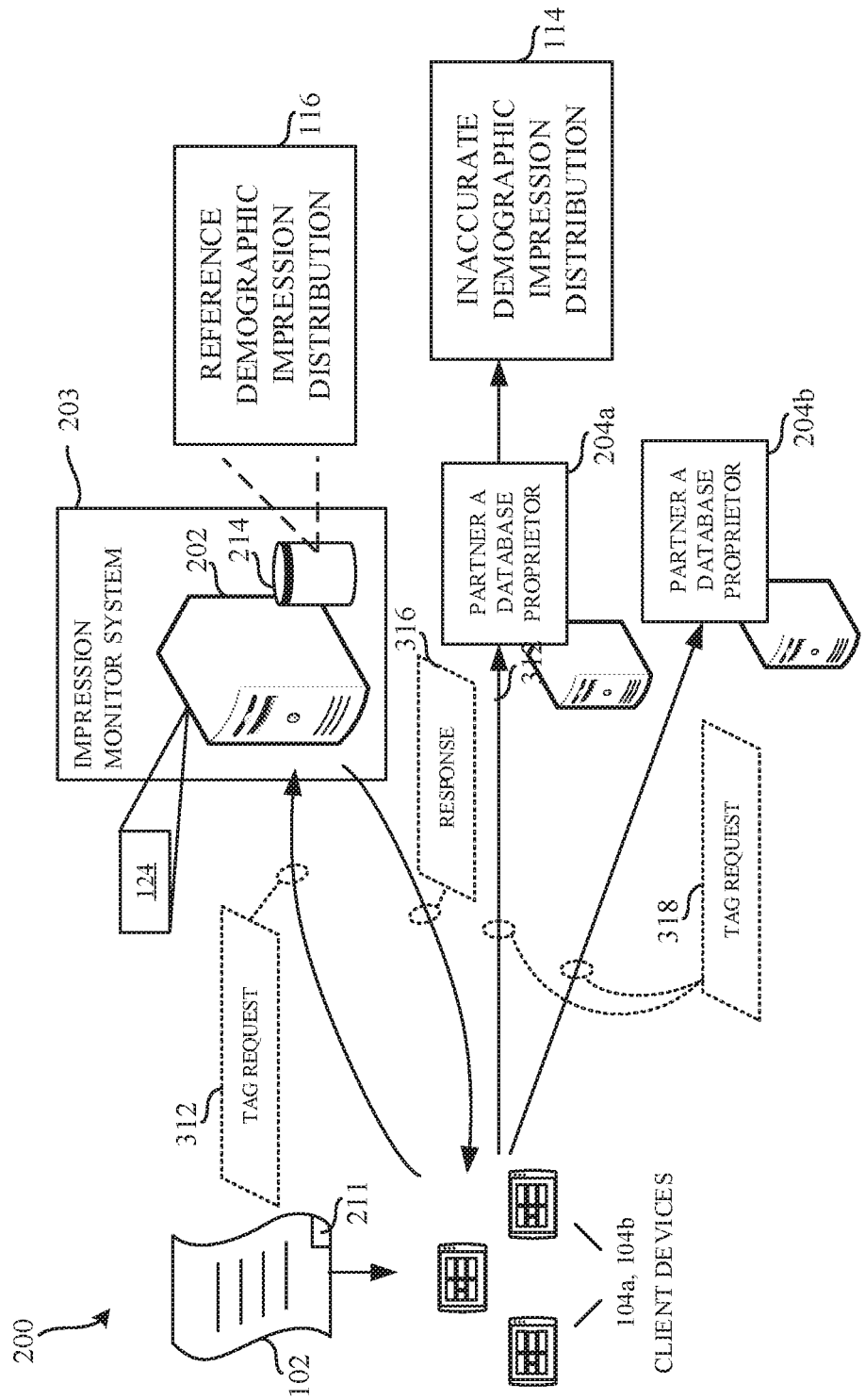
FIG. 3 illustrates another example impression collection technique based on redirect network communications between an audience measurement entity (AME) and client devices to facilitate logging impressions by the AME and one or more database proprietors.
Figure 4:
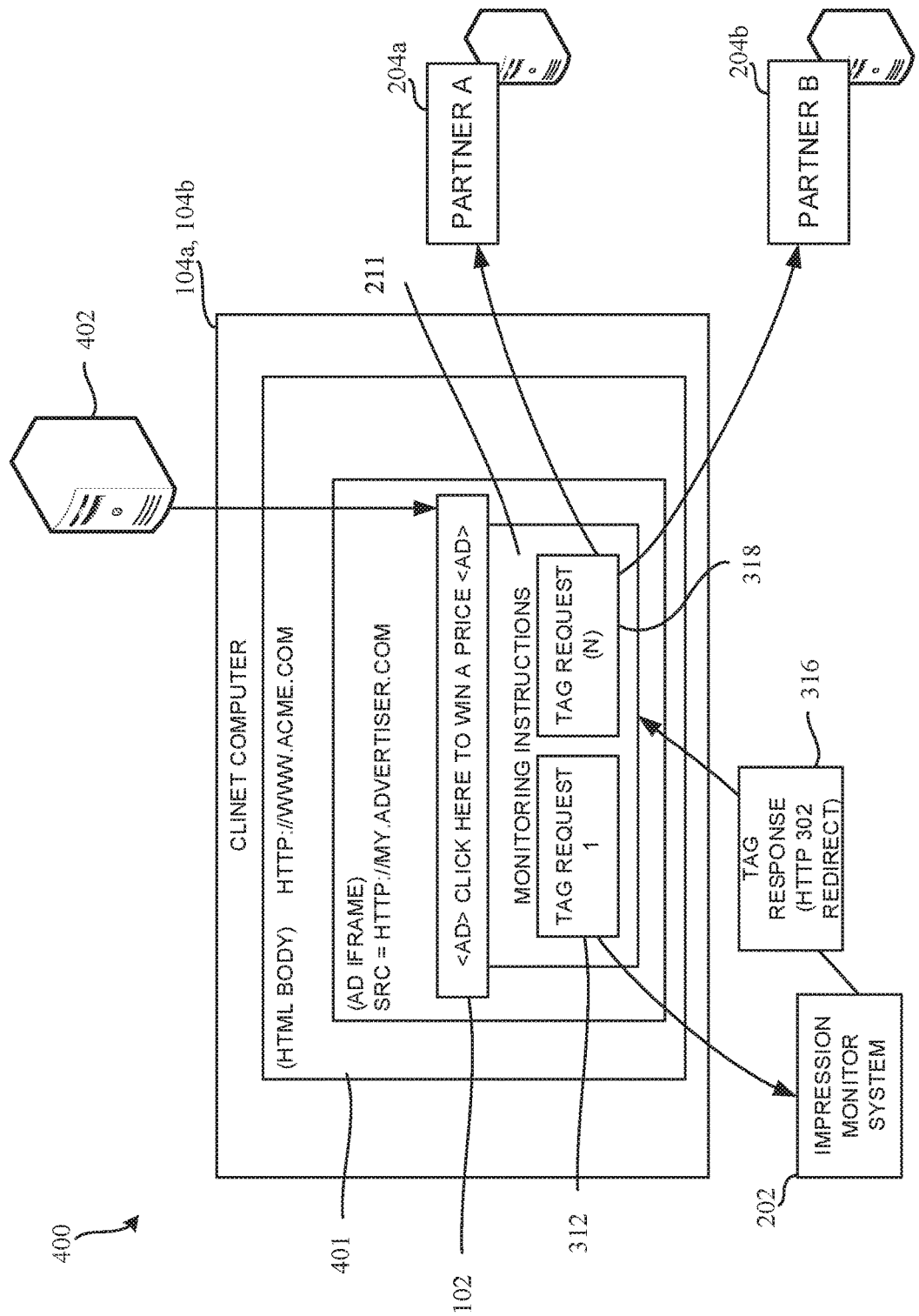
FIG. 4 illustrates an example manner in which the impression monitor system of FIGS. 2 and 3 logs impressions corresponding to media accessed by the client devices of FIGS. 1-3.

FIGS. 2-4 described below represent example techniques that may be employed by the database proprietor server 106 and the AME server 108 to log impressions reported by the client devices 104a, 104b. The database proprietor server 106 uses its logged impressions to generate the inaccurate demographic impression distribution 114, and the AME server 108 uses its logged impressions to generate the reference demographic impression distribution 116 of FIG. 1. Turning to FIG. 2, an example operating environment 200 includes the demographic impression distribution determiner 124 for determining the accuracy-improved demographic impression distribution 126 of FIG. 1. In the illustrated example, the operating environment 200 includes an impression monitor system 202 (e.g., impressions collector 202) which may be owned by, leased by, operated by, and/or operated on behalf of an audience measurement entity (AME) 203. The example, impression monitor system 202 includes the demographic impression distribution determiner 124. The impression monitor system 202 of the illustrated example may be implemented by the AME server 108 of FIG. 1. Although the demographic impression distribution determiner 124 is shown as implemented at the impression monitor system 202, in other examples, the demographic impression distribution determiner 124 may be implemented at the database proprietor server 106 and/or at any other computer separate from the database proprietor server 106 and the AME server 108.

In the illustrated example of FIG. 2, the impression monitor system 202 works cooperatively with one or more database proprietors, two of which are shown as a partner A database proprietor 204a and a partner B database proprietor 204b to log media impressions. In the illustrated example, the partner A database proprietor 204a may implement the database proprietor server 106. In the illustrated example of FIG. 2 the impression monitor system 202 logs panel-based media impressions corresponding to accesses by the client devices 104a, 104b to media 102. Panel-based media impressions are media impressions corresponding to panelist-users for which the AME 203 has accurate demographic information. In some examples, the impression monitor system 202 also logs census-level media impressions. Also in the illustrated example of FIG. 2, database proprietors 204a and 204b log demographic impressions corresponding to accesses by the client devices 104a, 104b to the media 102. The impression monitor system 202 of the illustrated example may be owned by, leased by, operated by, and/or operated on behalf of the audience measurement entity 203 to collect and log impressions from client devices 104a, 104b using, for example, AME cookies set on those client devices 104a, 104b. In examples disclosed herein, AME cookies are set in the client devices 104a, 104b in response to contacting the audience measurement entity 203 after executing monitoring or tag instructions 211 in the media 102. Because the impression monitor system 202 also logs census impressions, the impression monitor system 202 sets AME cookies in the devices 208 regardless of whether all, some, or none of the client devices 104a, 104b are used by persons registered in audience member panels of the audience measurement entity 203. That is, by setting AME cookies in the client devices 104a, 104b, the audience measurement entity 203 is able to log media impressions regardless of whether the media impressions are attributable to panelists or non-panelists.

In the illustrated example, content providers and/or advertisers distribute media 102 via the Internet to users that access websites and/or online television services (e.g., web-based TV, Internet protocol TV (IPTV), etc.). In the illustrated example of FIG. 2, the media 102 is presented to audience members via the client devices 104a, 104b. The example media 102 is encoded to include a media identifier (ID). The media ID may be any identifier or information that can be used to identify the corresponding media 102. In some examples the media ID is an alphanumeric string or value. In some examples, the media ID is a collection of information. For example, if the media 102 is an episode, the media ID may include program name, season number, and episode number. When the media 102 includes advertisements, such advertisements may be content and/or advertisements. The advertisements may be individual, stand-alone ads and/or may be part of one or more ad campaigns. The ads of the illustrated example are encoded with identification codes (i.e., data) that identify the associated ad campaign (e.g., campaign ID, if any), a creative type ID (e.g., identifying a Flash-based ad, a banner ad, a rich type ad, etc.), a source ID (e.g., identifying the ad publisher), and/or a placement ID (e.g., identifying the physical placement of the ad on a screen).

The media 102 of the illustrated example is tagged or encoded to include the monitoring or tag instructions 211, which are computer executable monitoring instructions (e.g., Java, Java script, or any other computer language or script) that are executed by web browsers that access the media 102 via, for example, the Internet. Execution of the monitoring instructions 211 causes the web browser to send impression requests 212, 218 (e.g., referred to herein as tag requests 212, 218) to one or more specified servers. In the illustrated example, the monitoring instructions 211 cause the browser to send tag requests 212 (e.g., the impression indication 111 of FIG. 1) to the impression monitor system 202 and to send tag requests 218 (e.g., the impression indication 110 of FIG. 1) to one or both of the database proprietors 204a-b. As used herein, tag requests 212, 218 are used by the client devices 104a, 104b to report occurrences of media impressions caused by the client devices accessing the media 102. The tag requests 212, 218 may be implemented using HTTP requests. However, whereas HTTP requests traditionally identify web pages or other resources to be downloaded, the tag requests 212, 218 of the illustrated example include audience measurement information (e.g., ad campaign identification, content identifier, and/or user identification information) as their payloads. The server (e.g., the impression monitor system 202 and/or servers at the database proprietors 204a, 204b) to which the tag requests 212, 218 are directed is programmed to log occurrences of impressions reported by the tag requests 212, 218.

To collect and log exposure measurements, the impression monitor system 202 includes an AME impressions store 214. In the illustrated example, based on logged impressions for a particular item of media 102 or a media campaign 102 (e.g., different versions of a web episode, different advertisements that form part of the same advertisement campaign, etc.), the impression monitor system 202 generates an reference demographic impression distribution 116 of FIG. 1. Also in the illustrated example, the database proprietor 204a logs user-level demographic impressions and uses the logged demographic impressions to generate the inaccurate demographic impression distribution 114 of FIG. 1.

In some examples, the impression monitor system 202 receives the inaccurate demographic impression distribution 114 from the database proprietor 204a so that the demographic impression distribution determiner 124 can determine the accuracy-improved demographic impression distribution 126 based on the inaccurate demographic impression distribution 114 and the reference demographic impression distribution 116. In other examples in which the demographic impression distribution determiner 124 is located in the database proprietor 204a, the impression monitor system 202 provides the reference demographic impression distribution 116 to the database proprietor 204a so that the demographic impression distribution determiner 124 at the database proprietor 204a can determine the accuracy-improved demographic impression distribution 126 based on the inaccurate demographic impression distribution 114 and the reference demographic impression distribution 116.

In some examples, advertisements tagged with the monitoring instructions 211 are distributed with Internet-based media such as, for example, web pages, streaming video, streaming audio, IPTV content, etc. As noted above, methods, apparatus, systems, and/or articles of manufacture disclosed herein are not limited to advertisement monitoring but can be adapted to any type of media monitoring (e.g., web pages, movies, television programs, etc.).

Turning now to another example impression collection technique illustrated in FIGS. 3 and 4, when a user of a client device 104a, 104b accesses media 102, the client device 104a, 104b sends a tag request 312 (e.g., the impression indication 111 of FIG. 1) to the impression monitor system 202 based on monitoring instructions 211 in the media 102. In the illustrated example, the impression monitor system 202 logs an impression for the client device 104a, 104b. The logged impression is indicative of the access to the media 102 at the client device 104a, 104b. In some examples, if the impression monitor system 202 determines that the client device 104a, 104b corresponds to a registered panelist of the AME 203, the impression monitor system 202 logs an impression in association with the corresponding panelist demographics previously collected by the AME 203 from the panelist during an enrollment process.

In the illustrated example of FIG. 3, the impression monitor system 202 receives the tag request 312 based on the media 102 presented via the client device 104a, 104b and logs an impression based on the presented media 102 in association with a respective AME cookie of the client device 104a, 104b. The example impression monitor system 202 stores the logged impressions in the AME impressions store 214. In the illustrated example, the impression monitor system 202 sends a response 316 to the client device 104a, 104b. In the illustrated example, the response 316 is an HTTP redirect to cause a browser of the client device 104a, 104b to send one or more tag requests 318 to one or more database proprietors 204a, 204b. That is, the response 316 redirects the client device 104a, 104b to the one or more database proprietors 204a, 204b to allow the database proprietors 204a, 204b to log demographic impressions if the client device 104a, 104b corresponds to a registered subscriber of the database proprietors 204a, 204b. An example of the redirect process is described below in connection with FIG. 4.

Turning to FIG. 4, an example communication flow diagram shows an example manner in which the impression monitor system 202 logs impressions corresponding to media 102 accessed by the client devices 104a, 104b. The example chain of events shown in FIG. 4 occurs when a client device 104a, 104b accesses the tagged media 102. In the illustrated example, the client device 104a, 104b sends an HTTP request to a server of a publisher 402 for the media 102. In the illustrated example of FIG. 4, a web browser 401 of the client device 104a, 104b receives the requested media 102 from the publisher 402.

In the illustrated example, the media 102 is tagged or encoded with monitoring instructions 211. Initially, the monitoring instructions 211 cause the web browser 401 of the client 104a, 104b to send a tag request 312 to the impression monitor system 202 when the media 102 is accessed. In the illustrated example, the client device 104a, 104b uses the tag request 312 to report an impression of the media 102 to the impression monitor system 202. Although the web browser 401 is shown, the impression collection techniques may be implemented using any other program or application on the client device 104a, 104b that accesses media 102. In the illustrated example, the web browser 401 sends the tag request 312 using an HTTP request addressed to the URL of the impression monitor system 202 at, for example, a first et domain. The tag request 312 includes a media ID associated with the media 102. In addition, the tag request 312 includes a document referrer www.acme.com), a timestamp of the impression, and a publisher site (e.g., the URL http://my.advertiser.com of the ad publisher 402). In addition, the tag request 312 may include an AME cookie set by the impression monitor system 202 in the client device 104a, 104b. In other examples, the AME cookie may not be passed until the client device 104a, 104b receives a request sent by a server of the impression monitor system 202 in response to, for example, the impression monitor system 202 receiving the tag request 312.

In response to receiving the tag request 312, the impression monitor system 202 logs an impression by recording a media ID (and/or any other relevant identification information) contained in the tag request 312. In the illustrated example, the impression monitor system 202 logs census-level impressions (e.g., logs impressions regardless of whether the impression monitor system 202 recognizes the client device 104a, 104b as corresponding to an AME panelist based on an AME cookie in the tag request 312).

In the illustrated example of FIG. 4, the impression monitor system 202 returns a tag response message 316 to the web browser 401 of the client 104a, 104b including an HTTP 302 redirect message and one or more URLs of one or more participating partner(s) 204a, 204b that operate at, for example, one or more second internet domains (e.g., different from the first internet domain of the AME 203).

In the illustrated example, prior to sending the tag response 316 to the web browser 401 of the client 104a, 104b, the impression monitor system 202 of the illustrated example may include a modified media ID (e.g., an encrypted ID, a replacement valve, a hash valve, etc.) in the tag response 316 to replace a media ID of the media 102 in subsequent tag request(s) 318 (e.g., the impression indication 110 of FIG. 1) that the client device 104a, 104b sends to one or more database proprietors 204a, 204b. The modified media ID is discernable only by the impression monitor system 202 as corresponding to the accessed media 102. For example, the impression monitor system 202 may store the modified media ID in the corresponding logged impression record. In some examples, the impression monitor system 202 and/or the monitoring instructions 211 prevent the client device 104a, 104b from sending any original media identification information of the media 102 to the partners 204a, 204b and to instead send the modified media ID. In this way, the identities and/or source(s) of the media 102 are masked from the database proprietors 204a, 204b. In such examples, the inaccurate demographic impression distribution 114 generated by the partner A database proprietor 204a is in association with the modified media ID rather than the original media ID of the media 102.

In response to receiving the tag response 316, the web browser 401 of the client 104a, 104b sends the tag request(s) 318 to the specified partner database proprietor(s) (e.g., at second internet domain(s)). The tag request 318 includes the modified media ID from the tag response 316. The partner A database proprietor 204a uses a partner cookie from the tag request 408 to determine whether the client 104a, 104b matches a registered user of services offered by the partner A database proprietor 204a. If a match is found, partner A database proprietor 204a has positively identified a client 104a, 104b. Accordingly, the partner A database proprietor 204a site logs an impression in association with the demographics information of the identified client. This log includes the modified media ID. In the event the partner A database proprietor 204a is unable to identify the client 104a, 104b in its records (e.g., no matching cookie), the partner A database proprietor 204a need not log an impression. In the illustrated example, the operations of the partner B 204b are substantially similar or identical to the operations of the partner A database proprietor 204a to log impressions for the accessed media 102.

Returning to FIG. 3, after the impression monitor system 202 logs a number of impressions corresponding to media accesses via the client devices 104a, 104b, the impression monitor system 202 generates the reference demographic impression distribution 116. In the illustrated example, the database proprietor 204a generates the inaccurate demographic impression distribution 114 based on its logged impression's. If the demographic impression distribution determiner 124 is implemented by the impression monitor system 202 at the AME 203, the database proprietor 204a sends the inaccurate demographic impression distribution 114 to the demographic impression distribution determiner 124 at the AME 203. Otherwise, if the demographic impression distribution determiner 124 is implemented at the database proprietor 204a, the impression monitor system 202 sends the reference demographic impression distribution 116 from the AME 203 to the inaccurate demographic impression distribution 114.

Figure 5:
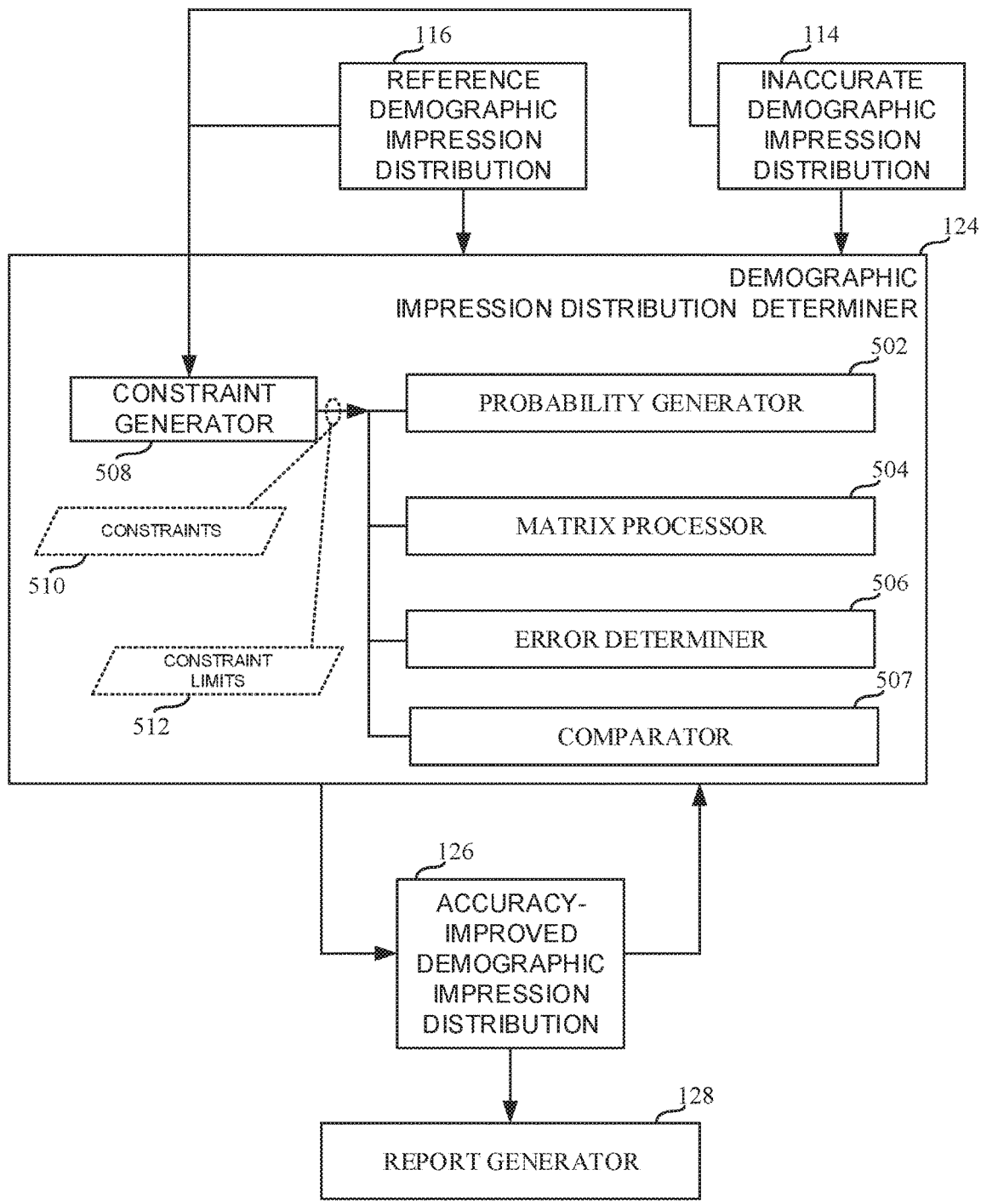
FIG. 5 illustrates the example demographic impression distribution determiner of FIGS. 1-3, to determine an updated demographic impression distribution in accordance with teachings of this disclosure.

FIG. 5 illustrates the example demographic impression distribution determiner 124 of FIG. 1, including an example probability generator 502, an example matrix processor 504, an example error determiner 506, an example comparator 507, and an example constraint generator 508. The example demographic impression distribution determiner 124 obtains and/or receives information such as the inaccurate demographic impression distribution 114 and/or the reference demographic impression distribution 116 (FIG. 1).

The demographic impression distribution determiner 124 is provided with the example probability generator 502 to determine an accuracy-improved demographic impression distribution 126 (FIG. 1) based on the inaccurate demographic impression distribution 114, the constraints 122, and a multiplier. In examples disclosed herein, the multiplier is a Lagrange multiplier used to solve a constrained optimization problem by measuring a change in optimal value. However, examples disclosed herein may be implemented using other suitable types of multipliers. In some examples disclosed herein, the probability generator 502 may determine the accuracy-improved demographic impression distribution 126 based on a weight (e.g., a value reflective of a total number of audience members using the client devices 104a and/or 104b).

The demographic impression distribution determiner 124 is provided with the example matrix processor 504 to compute a matrix (e.g., a Jacobian Matrix) using the constraints 510 and an estimated demographic impression distribution (P), as shown below in Equation 4. In examples disclosed herein, the estimated demographic impression distribution (P) is representative of impression counts obtained by the database proprietor server 106 distributed across different demographic segments (e.g., age, gender, race, etc.). In other examples disclosed herein, the estimated demographic impression distribution (P) and/or the prior demographic impression information (Q) may describe other demographic distributions and/or impressions such as geographic regions, income levels, total purchases, total visits, etc. For example, the matrix processor 504 may compute the matrix (e.g., the Jacobian Matrix shown below in Equation 6) in segments by computing linear combinations. In examples disclosed herein, one of the segments is a first matrix representative of element-wise multiplication between the constraints 510 and the estimated demographic impression distribution (P). The example matrix processor 504 may compute a second matrix to produce the Jacobian Matrix by multiplying the linear combination of element-wise multiplication of the first matrix with an additional matrix representational of the constraints 510. In examples disclosed herein, the matrix (e.g., the Jacobian Matrix shown below in Equation 6) computed by the matrix processor 504 may include variations of the above-described matrices, such as a transpose form and/or any proportional matrix, as shown below in Equation 6. For example, the matrix processor 504 may determine the first matrix using element-wise multiplication between a constraint matrix (e.g., the constraints 510) and a first transpose matrix of the estimated demographic impression distribution (P). The constraint matrix (e.g., the constraints 510) is based on the reference demographic impression distribution 116. The matrix processor 504 determines the second matrix (e.g., the Jacobian Matrix shown below in Equation 6) by multiplying the first matrix with a second transpose matrix of the constraint matrix the constraints 522). The example matrix processor 504 generates a matrix (e.g., a Jacobian Matrix, the second matrix, shown below in Equation 6) to be used by the example error determiner 506.

The demographic impression distribution determiner 124 is provided with the example error determiner 506 to determine a compliance error (F), shown below in Equation 5, associated with the estimated demographic impression distribution (P), as shown below in Equation 5. The example compliance error (F) represents a distance between the estimated demographic impression distribution (P) and the constraint limits 512 (A). For example, if a high compliance error exists, a large difference between the estimated demographic impression distribution (P) and the constraint limits 512 (A) remains. In such examples, the demographic impression distribution determiner 124 updates the Lagrange multipliers ($\lambda$) (e.g., adjusts in response to a Lagrange multiplier change value ($\Delta\lambda$), shown below in Equation 8) to create an updated estimated demographic impression distribution (P). The Lagrange multiplier change value ($\Delta\lambda$) is an error indicator value (e.g., Equation 7 shown below) such that when the error indicator value exceeds a threshold (e.g., a tolerance), the error indicator value ($\Delta\lambda$) is indicative of the existence of a compliance error (F) value that is not acceptable. The error indicator value (e.g., the Lagrange multiplier change value ($\Delta\lambda$)) represents that there is a compliance error (F) between the constraint limits 512 (A) and a product matrix in which the constraints 510 (C) are multiplied by the estimated demographic impression distribution (P). That is, the compliance error (F) represents a measure of how much the estimated demographic impression distribution (P), subject to the constraint 510 (e.g., the constraints (C)), is out of compliance with the constraint limits 512 (e.g., the constraint limits (A)).

The demographic impression distribution determiner 124 is provided with the example comparator 507 to determine whether the Lagrange multipliers ($\lambda$) utilized by the probability generator 502 need to be adjusted. Examples disclosed herein include adjusting the Lagrange multipliers until the error indicator satisfies an error threshold (e.g., an error tolerance). The error threshold or error tolerance may be any suitable value for which a value of the error indicator ($\Delta\lambda$) corresponds to an acceptable compliance error (F) of the estimated demographic impression distribution (P). For example, if the error indicator threshold is 0.1, the Lagrange multipliers ($\lambda$) are adjusted until the error indicator ($\Delta\lambda$) obtained by the error determiner 506 is less than or equal to 0.1.

The demographic impression distribution determiner 124 is provided with the example constraint generator 508. The constraint generator 508 obtains the inaccurate demographic impression distribution 114 from the database proprietor server 106 and the reference demographic impression distribution 116 from the audience measurement entity server 108. In the illustrated example, the constraint generator 508 creates a matrix of constraints 510 (C) and a matrix of constraint limits 512 (A). The constraint limits 512 (A) may be a maximum and/or minimum number of impressions represented in the inaccurate demographic impression distribution 114 from the database proprietor server 106 and/or a maximum and/or minimum number of impressions represented in the reference demographic impression distribution 116 from the audience measurement entity server 108. The constraints 510 (C) and/or the constraint limits 512 (A) may be in the form of a matrix, array, list, sequence of numbers, or any method of organizing data.

FIG. 6 is example pseudocode representative of machine readable instructions that may be executed to implement the demographic impression distribution determiner of FIGS. 1-3 and 5 to determine accuracy-improved demographic impression distributions. For example, the instructions represented in FIG. 6 may be executed by a processor (e.g., the processor 1112 of FIG. 11) to implement the probability generator 502, the matrix processor 504, the error determiner 506, the comparator 507, the constraint generator 508 of FIG. 5 and/or more generally the demographic impression distribution determiner 124 of FIGS. 1-3 and 5. The demographic impression distribution determiner 124 may obtain the inaccurate demographic impression distribution 114 and the reference demographic impression distribution 116 from the database proprietor server 106 and the AME server 108, respectively. In the example illustrated in FIG. 6 the lines of code (LOCs) 1-17 and 22 may be executed to implement the probability generator 502. At LOC 5 of FIG. 6, the probability generator 502 initializes prior demographic impression data (D=D(:)). For example, the prior demographic impression data (D=D(:)) is the reference demographic impression distribution 114 of FIGS. 1-3. At LOC 6, the probability generator 502 initializes constraints (Q=Q(:)). For example, the constraints (Q=Q(:)) are the constraints 510 of FIG. 5. At LOC 7, the probability generator 502 initializes weight values (W=W(:)). For example, the weight values (W=W(:)) are the weights depicted below in Equation 1). At LOC 12, the probability generator 502 initializes the Lagrange multipliers (L=zeros(nc, 1)). In FIG. 6, the variable "L" represents the Lagrange multipliers $\lambda$. At LOC 14, the probability generator 502 initializes the tolerance (tol=10*eps) (e.g., an error tolerance or error threshold). At LOC 22, the probability generator 502 generates estimated demographic impression distribution (P=evalP(C,Q,L,W)). At LOC 23, the error determiner 506 calculates the compliance error (F=C*P−D). At LOC 24, the matrix processor 504 determines the Jacobian Matrix (J=(bsxfun@times, C,(P./W)'))*C'). At LOC 25, the error determiner 506 determines the error indicator (delta_L=J\(−F)). For example, the error indicator (delta_L=J\(−F)) is the Lagrange multiplier change value ($\Delta\lambda$). At LOC 26, the error determiner 506 or the probability generator 502 reinitialize the Lagrange multipliers (L or $\lambda$) by adding the magnitude of the error indicator (L=L+delta_L). At LOCs 28-30, the comparator 507 determines if the error indicator is less than the tolerance (e.g., the error threshold). At LOCs 34-41, the probability generator 502 determines that the estimated demographic impression distribution determined in LOC 22 is the accuracy-improved demographic impression distribution 126 of FIG. 1 (e.g., the error indicator satisfies the threshold). In some examples disclosed herein, LOCs 19-30 may be executed at least one more time after the error indicator satisfies the threshold so that the accuracy of the accuracy-improved demographic impression distribution 126 of FIG. 1 can be increased further than the accuracy at the time when the error indicator satisfies the threshold.

After the execution of LOCs 1-22, the matrix processor 504 of FIG. 5 may determine the Jacobean Matrix, (LOC 24), based on the matrices determined by the probability generator 502 of FIG. 5. Additionally, the error determiner 506 of FIG. 5 may determine whether the Lagrange multipliers (L or λ) utilized by the probability generator 502 are to be adjusted (LOCs 25-30). The example probability generator 502, the example matrix processor 504, the example error determiner 506, and/or the example comparator 507 may iterate any of the operations of LOCs 21-30 until the Lagrange multipliers (L or λ) (LOCs 12 and 26) utilized by the probability generator 502 no longer need to be adjusted. When the Lagrange multipliers (L or λ) no longer need to be adjusted, the probability generator 502 executes LOCs 31-42 to generate the accuracy-improved demographic impression distribution 126 of FIG. 1 (e.g., LOC 41 (P=Q*exp(C'*L./W)).

Examples disclosed herein determine the accuracy-improved demographic impression distribution 126 of FIGS. 1-3 and 5 by solving maximum entropy distributions of impressions. Examples disclosed herein solve such maximum entropy distributions by minimizing Equation 1 below.

$$\text{minimize}_p D(P:Q) = \sum_{i=1}^{n} w_i \left( p_i \log \frac{p_i}{q_i} - p_i + q_i \right),$$ (Equation 1)

subject to

In Equation 1 above, P is the estimated demographic impression distribution, Q is the prior impression distribution (e.g., the reference demographic impression distribution 116), and W is the weight for each estimated demographic impression distribution P. The variable j represents the number of constraints and the variable i represents the number of probabilities. In some examples, each probability (e.g., $p_i$ may include its own corresponding weight (e.g., $w_i$). In some examples disclosed herein, the prior demographic impression distribution Q can be set to 1 for an uninformative prior (e.g., if no prior impression distribution data exists) Furthermore, examples disclosed herein minimize Equation 1 above utilizing constraints (e.g., the constraints 510) shown below in Equation 2 below.

$$\Sigma_{i=1}^{n} c_{ji} p_i = a_j, j=1, \ldots, m$$ (Equation 2)

In Equation 2, the matrix c represents the constraints (e.g., the constraints 510), p represents the estimated demographic impression distribution determined by the probability generator 502, and p represents the constraint limits (e.g., the constraint limits 512). The variable j represents the number of constraints and the variable i represents the number of probabilities.

The above-mentioned methods and apparatus execute the following Equations 3-8 to minimize Equation 1.

$$\lambda = 0$$ (Equation 3)

In Equation 3 above, λ is the Lagrange multiplier which is initialized to zero. In examples disclosed herein, the probability generator 502 utilizes the Lagrange multiplier λ to generate the estimated demographic impression distribution P, using Equation 4 below.

$$P = Qe^{-C^t \lambda}$$ (Equation 4)

In Equation 4 above, P is the estimated demographic impression distribution which is determined by the probability generator 502, Q corresponds to the reference demographic impression distribution 116, $C^t$ corresponds to a transpose matrix of the constraints 510, and λ corresponds to the Lagrange multipliers.

$$F = CP - A$$ (Equation 5)

In Equation 5 above, F is the compliance error, C corresponds to the constraint matrix 510, and A corresponds to the limiting constraints 512.

$$J = (C \times P^t) C^t$$ (Equation 6)

In Equation 6 above, J represents the Jacobian Matrix which is determined by the matrix processor 504, C corresponds to the constraint matrix 510, $P^t$ corresponds to a transpose matrix of the estimated demographic impression distribution P, and $C^t$ corresponds to a transpose matrix of the constraints 510.

$$J(\Delta \lambda) = F$$ (Equation 7)

In Equation 7 above, J represents the Jacobian Matrix which is determined by the matrix processor 504, Δλ corresponds to the Lagrange multipliers change value, and F corresponds to the compliance error.

$$\lambda = \Delta \lambda + \lambda$$ (Equation 8)

In Equation 8 above, the error determiner 506 and/or the probability generator 502 calculate new Lagrange multipliers (λ) in response to determining a Lagrange multiplier change value (Δλ).

In Equation 1, initially the values of the Lagrange multipliers (λ) are set to 0; however, in some examples disclosed herein, the value of the Lagrange multipliers (λ) may be set to any suitable value (e.g., a value known to minimize Equation 1 above quickly). The constraint matrix (C) (the constraints 510 of FIG. 5) identify what the estimated demographic impression distribution (P) should equal. The constraint limits (A) (e.g., the constraint limits 512) may include data from the constraint matrix (C) (e.g., the constraints 510) in which the accuracy-improved demographic distribution 126 should model. In some examples disclosed herein, the constraint matrix (C) (e.g., the constraints 510), and/or the constraint limits (A) (e.g., the constraint limits 512) may be generated based on the total number of impressions collected by the database proprietor server 106 (e.g., the reported impressions 110). In some examples, W=1 (e.g., no weight adjustment). However, the weight (W) may vary when population group sizes vary. For example, if 10 of the probabilities represent a larger demographic of 100 individuals, then the weight value is set equal to 100 (e.g., W=100) for those 10 probabilities.

An example implementation includes two websites (website A and website B) being visited (e.g., the client devices 104a, 104b visit two websites (the media 102)) by a certain number of individuals. The audience measurement entity universe estimate (UE) for males is 1,000 individuals, and the UE for females is 2,000. The "universe" is representative of all the audience members involved in an audience measure. The UE values may be derived from prior impression counts (e.g., reported impressions 111) that were incremented in the AME server 108. In examples disclosed herein, LIE values are sent to the constraint generator 508 as the reference demographic impression distribution 116. The constraint generator 508 generates the constraint limits 512 to model the accuracy-improved demographic impression distribution 126 based on the trusted UE values. Continuing the example, the database proprietor server 106 may receive the reported impressions 110. In this example, the reported impressions 110 represents knowledge that 500 people of mixed demographics (e.g., unknown age, gender, race, etc.) that visited website A and 700 people of mixed demographics unknown age, gender, race, etc.) that visited at least one of the websites (e.g., website A, website 13, or both) from the database proprietor server 106. However, this knowledge from the database proprietor server 106 includes inaccurate and/or incomplete demographic impression distributions (e.g., the inaccurate demographic impression distribution 114) represented by the error 118 of FIG. 1.

The database proprietor server 108 may provide this information to the AME server 108 to determine the accuracy-improved demographic distribution 126 across both websites (website A and website B) for the database proprietor server 106.

Under the assumption that there are only two genders (e.g., no gender plus age scenario), (1) for each demographic there are four possible states which may have occurred (neither website visited, only website A visited, only website B visited, both websites A and B visited), and (2) it is the same scenario for each demographic, in this case two. Therefore, there exist 8 possible states any person belongs to; half are discarded if not the right demographic, and of the four remaining one is selected based on that person's behavior.

In this case, the database proprietor server 106 estimates the eight probability distributions of individuals in the probability states P(1)-P(8); enumerated in Table 1 as followed:

TABLE 1

| | |
|---|---|
| P(1) | Proportion of Males in None |
| P(2) | Proportion of Males visited A only |
| P(3) | Proportion of Males visited B only |
| P(4) | Proportion of Males visited both A and B |
| P(5) | Proportion of Females in None |
| P(6) | Proportion of Females visited A only |
| P(7) | Proportion of Females visited B only |
| P(8) | Proportion of Females visited both A and B |

Notice that although there exists one variable name, the estimated demographic impression distribution P, two distributions are being solved for. One distribution is P(1)-P(4) and the other distribution is P(5)-P(8).

To illustrate further, the estimated demographic impression distribution (P) is the output of the algorithm. When the estimated demographic distribution (P) is sufficiently accurate (e.g., based on the Lagrange multiplier change value $(\Delta\lambda)$ satisfying a tolerance, the estimated demographic impression distribution (P) is set to the accuracy-improved demographic impression distribution 126 of all probability states (e.g., the eight probability states). The prior demographic information (Q) is the same length as the estimated demographic impression distribution (P) and represents any prior knowledge that may exist concerning the inaccurate and/or incomplete impression distribution (e.g., the inaccurate demographic impression distribution 114). The reference demographic impression distribution (Q) (e.g., the reference demographic impression distribution 116) may be generated based on surveys or previous studies, and the results stored in the AME server 108. For example, if the reference demographic impression distribution (Q) (e.g., the reference demographic impression distribution 116) represents that a proportion of males who visited both websites A and B is around 10%, then Q(4)=0.1. This does not imply P(4)=10% because that 10% value may be inconsistent with known totals (e.g., the constraint limits 512 (A) of FIG. 5). However, the solution will be as close to 10% as possible.

The number of rows in the constraint matrix (C) (e.g., the constraints 510) is the number of constraints, and the number of columns is the same as the number of probabilities (e.g., P(1)-P(8)). With respect to the example above, there exists four constraint limits (A) (e.g., the constraint limits 512) which include the total people visiting website A is 500, the total people visiting either website or B is 700 people, the total males is 1,000, and the total females is 2,000. In the above example, the constraint matrix (C) (e.g., the constraints 510) may be expressed as:

($C_1$): $UE_{MALES}*A+UE_{MALES}*AB+UE_{FEMALES}*A+UE_{FEMALES}*AB=500$ ($C_2$): $UE_{MALES}A+UE_{MALES}*B+UE_{MALES}*AB+UE_{FEMALES}*A+UE_{FEMALES}*B+UE_{FEMALES}*AB=700$ ($C_3$): $UE_{MALES}*\text{Neither}+UE_{MALES}*A+UE_{MALES}*B+UE_{MALES}*AB=1000$ ($C_4$): $UE_{FEMALES}*\text{Neither}+UE_{FEMALES}*A+UE_{FEMALES}*B+UE_{FEMALES}*AB=2000$ In some examples disclosed herein, a consistent or valid value for the constraint matrix (C) (e.g., the constraints 510) multiplied by the estimated demographic impression distribution (P) equals should equal the constraint limits A (as shown in Equation 5). For example, in Equation 5, the compliance error (F) equals zero when the constraint matrix (C) (the constraints 510) multiplied by the estimated demographic impression distribution (P) equals or is close to (e.g., within a threshold of) the constraint limits (A). An example matrix implementation based on the above constraint values (e.g., $C_1$-$C_4$) is shown below:

$$C = \begin{bmatrix} 0 & 1000 & 0 & 1000 & 0 & 2000 & 0 & 2000 \\ 0 & 1000 & 1000 & 1000 & 0 & 2000 & 2000 & 2000 \\ 1000 & 1000 & 1000 & 1000 & 0 & 0 & 0 & 0 \\ 0 & 0 & 0 & 0 & 2000 & 2000 & 2000 & 2000 \end{bmatrix}$$

The constraint limits A (e.g., the constraint limits 512) for the above example may be represented as:

$$A = \begin{bmatrix} 500 \\ 700 \\ 1000 \\ 2000 \end{bmatrix}$$

Therefore, the estimated demographic impression distribution P is updated until it satisfies the real-world constraints of C*P=A (e.g., when the compliance error F in Equation 3 is 0). Examples disclosed herein may be used to implement many solutions. For example, in the above-mentioned example, there exist 8 probabilities and 4 constraints, therefore by minimizing Equation 1 the optimal solution can be produced.

The matrix processor 504 of FIG. 5 determines the compliance error (F). The compliance error (F) is a measure of how far much the estimated demographic impression distribution (P) deviates from the constraint limits (A). For example, if the current value of the estimated demographic impression distribution (P) is [0.25 0.25 0.25 0.25 0.25 0.25 0.25 0.25], then the constraint matrix (C) (e.g., the constraints 510) multiplied by the estimated demographic impression distribution (P) equals [1500 2250 1000 2000]. In such an example, the estimated demographic impression distribution (P) does not satisfy the constraint limits (A) (e.g., the constraint limits 512). The last two constraints are satisfied. However, the first two constraints (e.g., 1500 and 2500) are not satisfied. In this example, the compliance error (F) indicates the estimated demographic impression distribution (P) is incorrect on the first constraint by 1,000 people and on the second constraint by 1550 people. Therefore, the compliance error (F) is equivalent to [1000 1550 0 0].

After determining the compliance error (F), the matrix processor 504 determines the Jacobian Matrix (J). In examples disclosed herein, the Jacobian Matrix (J) is a function of the constraint matrix (C) (e.g., the constraints 510) and the estimated demographic impression distribution (P). In the current example, the Jacobian Matrix (J) is utilized along with the compliance error (F) to determine a Lagrange multiplier change value ($\Delta\lambda$). The Lagrange multiplier change value ($\Delta\lambda$) may be updated by the demographic impression distribution determiner 124 (e.g., Equation 8). Furthermore, the estimated demographic impression distribution (P) is recalculated based on the new Lagrange multiplier value ($\lambda$) (e.g., Equation 4 is executed again by the probability generator 502). In examples disclosed herein, the probability generator 502 generates the estimated demographic impression distribution (P) until the Lagrange multiplier change indicator value ($\Delta\lambda$) satisfies a threshold, thereby indicating that the accuracy-improved demographic impression distribution 126 has been generated or can be generated in one or more iteration of minimizing Equation 1 above.

While an example manner of implementing the example probability generator 502, the example matrix processor 504, the example error determiner 506, the example comparator 507, the example constraint generator 508, the example report generator 128, and/or the example demographic impression distribution determiner 124, of FIGS. 1-3, and 5 are illustrated in FIG. 5, one or more of the elements, processes and/or devices illustrated in FIGS. 1-3, and 5 may be combined, divided, re-arranged, omitted, eliminated and/or implemented in any other way. Further, the example probability generator 502, the example matrix processor 504, the example error determiner 506, the example comparator 507, the example constraint generator 508, the example report generator 128, and/or the example demographic impression distribution determiner 124, of FIGS. 1-3, and 5 may be implemented by hardware, software, firmware and/or any combination of hardware, software and/or firmware. Thus, for example, any of the example probability generator 502, the example matrix processor 504, the example error determiner 506, the example comparator 507, the example constraint generator 508, the example report generator 128, and/or the example demographic impression distribution determiner 124, of FIGS. 1-3, and 5 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example probability generator 502, the example matrix processor 504, the example error determiner 506, the example comparator 507, the example constraint generator 508, the example report generator 128, and/or the example demographic impression distribution determiner 124, of FIGS. 1-3, and 5 is/are hereby expressly defined to include a non-transitory computer readable storage device or storage disk such as a memory, a digital versatile disk (DVD), a compact disk (CD), a Blu-ray disk, etc. including the software and/or firmware. Further still, the example demographic impression distribution determiner 124, of FIGS. 1-3, and 5 may include one or more elements, processes and/or devices in addition to, or instead of, those illustrated in FIGS. 1-3, and 5, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the example probability generator 502, the example matrix processor 504, the example error determiner 506, the example comparator 507, the example constraint generator 508, the example report generator 128, and/or the example demographic impression distribution determiner 124, of FIGS. 1-3, and 5 is shown in FIGS. 7-10. The machine readable instructions may be one or more executable program(s) or portion(s) of one or more executable programs for execution by a computer processor such as the processor 1112 shown in the example processor platform 1100 discussed below in connection with FIG. 11. The program(s) may be embodied in software stored on a non-transitory computer readable storage medium such as a CD-ROM, a floppy disk, a hard drive, a EWE), a Blu-ray disk, or a memory associated with the processor 1112, but the entire program and/or parts thereof could alternatively be executed by a device other than the processor 1112 and/or embodied in firmware or dedicated hardware. Further, although the example program(s) is/are described with reference to the flowcharts illustrated in FIGS. 7-10, many other methods of implementing the example probability generator 502, the example matrix processor 504, the example error determiner 506, the example comparator 507, the example constraint generator 508, the example report generator 128, and/or the example demographic impression distribution determiner 124, of FIGS. 1-3, and 5 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 7-10 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 7:
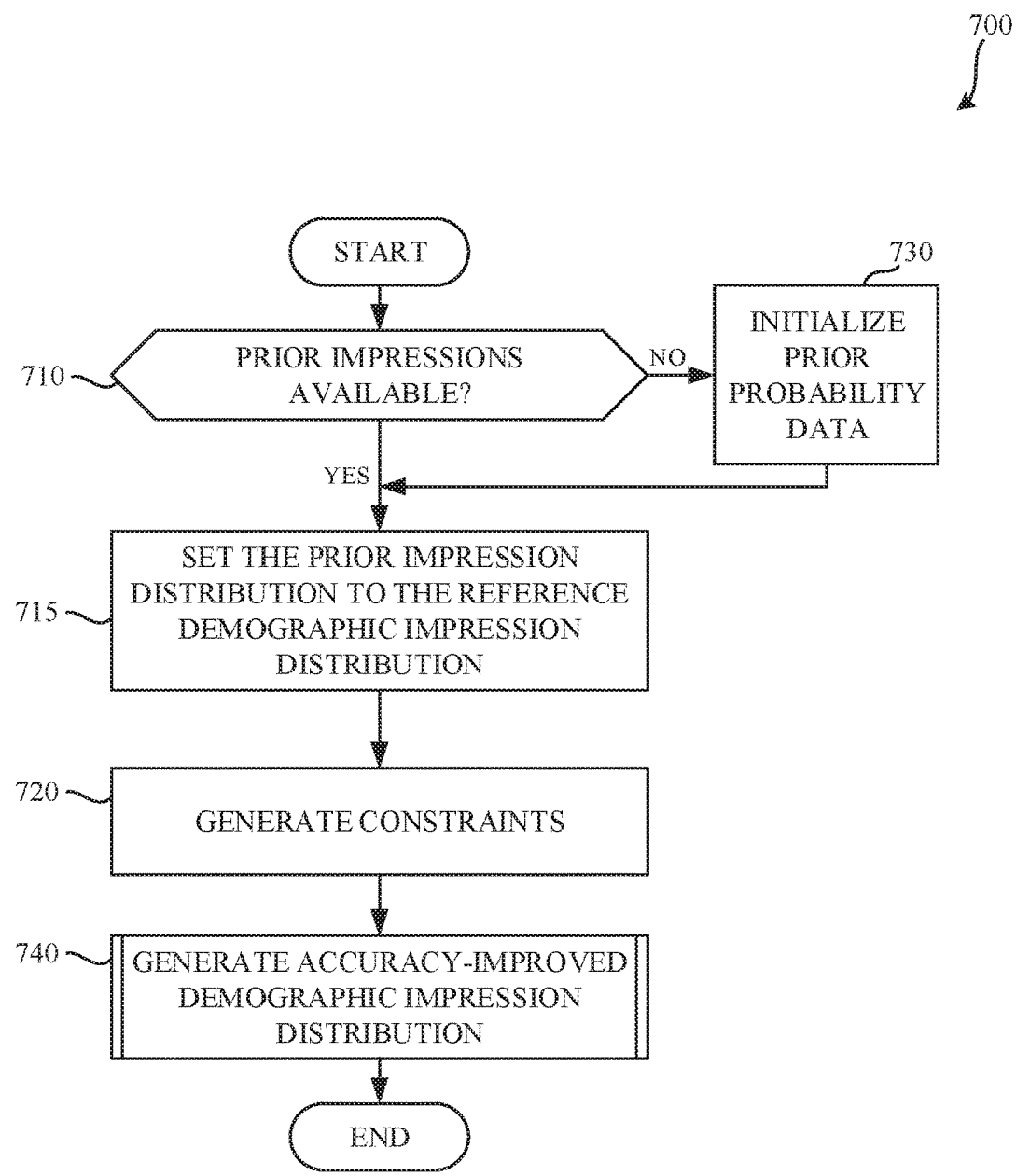
FIG. 7 is a flowchart representative of example machine readable instructions that may be executed to implement the demographic impression distribution determiner of FIGS. 1-3 and/or 5 to determine an accuracy-improved demographic impression distribution.

FIG. 7 is a flowchart 700 representative of machine readable instructions that may be executed to implement the demographic impression distribution determiner 124 of FIGS. 1-3, and/or 5 to determine an accuracy-improved demographic impression distribution 126 of FIGS. 1 and/or 5. The demographic impression distribution determiner 124 determines if prior impressions are available (block 710). Prior impressions are demographic impressions having a prior probability distribution across multiple demographic segments that accessed one or more items of media under analysis. The prior probability distribution of the prior impressions is known to be highly accurate because the prior impressions are collected based on known accurate demographics and are free of or substantially free of misattributions. In some examples, to achieve such high accuracy, the prior impressions are collected based on user devices 104a, 104b of panel members of the AME 203. In other examples, the prior impressions may be collected by other entities (e.g., a database proprietor) that can achieve such high accuracy for a prior demographic impression distribution. When prior impressions are available, the reference demographic distribution 116 of FIGS. 1-3 and 5 is set as the prior probability distribution of the prior impressions (block 715). If prior impressions are not available, the probability generator 502 initializes prior probability distribution data (block 730). For example, the constraint generator 502 initializes a prior probability distribution to all zeros for use as the reference demographic impression distribution 116. The constraint generator 508 of FIG. 5 determines and/or generates the constraints 522 (e.g., the constraints (C) and/or the constraint limits (A) of Equation 2 above) (block 720). For example, the constraint generator 508 determines the constraints 522 based on the reference demographic impression distribution 116. In other examples disclosed herein, the probability generator 502 may initialize the Lagrange multipliers ($\lambda$) to be zero, or any suitable numerical value, le determining the constraints 522.

The demographic impression distribution determiner 124 determines the accuracy-improved demographic impression distribution 126 of FIGS. 1 and/or 5 (block 740) based on the prior probability distribution (e.g., the reference demographic impression distribution 114) and the constraints 522. The example process of block 740 may be implemented as described below in connection with FIGS. 8-10.

Figure 8:
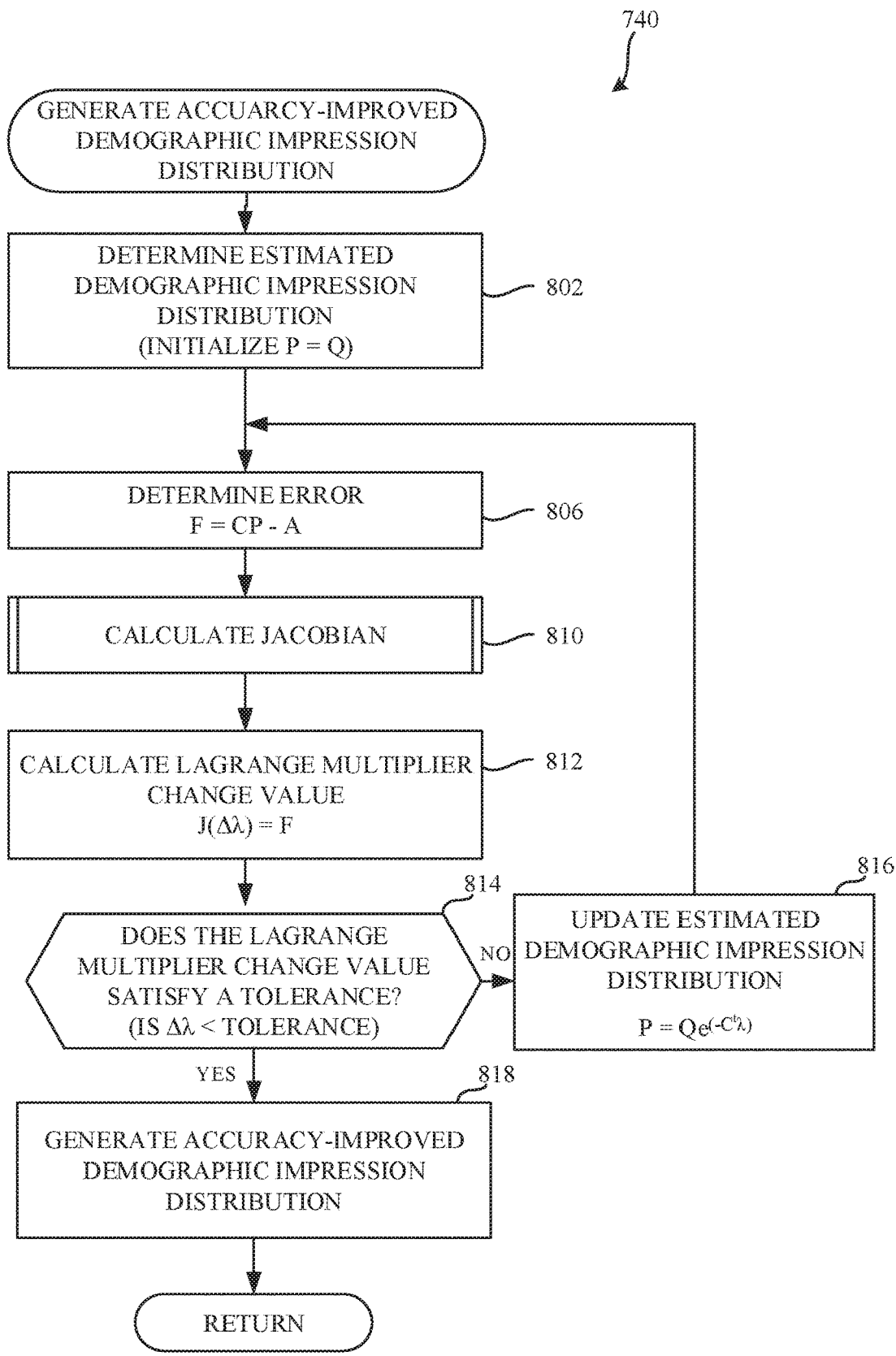
FIG. 8 is a flowchart representative of example machine readable instructions that may be executed to implement the demographic impression distribution determiner of FIGS. 1-3 and/or 5 to generate the accuracy-improved demographic impression distribution of FIGS. 1 and/or 5.

FIG. 8 is a flowchart representative of example machine readable instructions that may be executed to implement the demographic impression distribution determiner 124 of FIGS. 1-3 and/or 5 to generate the accuracy-improved demographic impression distribution 126 of FIGS. 1 and/or 5. The example process of FIG. 8 may be used to implement block 740 of FIG. 7. The example probability generator 502 determines an estimated demographic impression distribution (P) (block 802). For example, the probability generator 502 sets the estimated demographic impression distribution (P) as equal to the prior demographic impression distribution (Q). For example, the prior demographic impression distribution (Q) is the reference demographic impression distribution 116 of FIGS. 1-3 and 5 (block 802).

In examples disclosed herein, the error determiner 506 determines a compliance error (F) (block 806). For example, the error determiner 506 determines the compliance error (F) using Equation 5 above for the estimated demographic impression distribution P. In examples disclosed herein, the compliance error (F) may be calculated by subtracting the constraint limits (A) (e.g., the constraint limits 512) from a product of the constraints (C) (e.g., the constraints 522) multiplied by the estimated demographic impression distribution (P). Since the estimated demographic impression distribution (P) is to align with the reference demographic impression distribution 116, the value of the compliance error (F) results from the estimated demographic impression distribution (P) not aligning with the reference demographic impression distribution 116.

The error determiner 506 determines a Jacobian Matrix (J) (block 810). An example process for determining the Jacobian Matrix (J) at block 810 is described below in connection with FIG. 9. The error determiner 506 calculates and/or determines the Lagrange multiplier change value ($\Delta\lambda$) (block 812). For example, the error determiner 506 may calculate the Lagrange multiplier change value ($\Delta\lambda$) by multiplying the compliance error (F) by the inverse of the Jacobian Matrix (J) using Equation 7 above. The example comparator 507 determines if the Lagrange multiplier change value ($\Delta\lambda$) satisfies a threshold or tolerance (block 814). For example, the comparator 507 may determine that the estimated demographic impression distribution (P) is sufficiently accurate if the Lagrange multiplier change value ($\Delta\lambda$) corresponding to the estimated demographic impression distribution (P) is less than a tolerance or threshold. If the Lagrange multiplier change value (Δλ) satisfies the threshold, the probability generator 502 generates the accuracy-improved demographic impression distribution 126 for the report generator 128 (block 818). For example, the probability generator 502 sets the accuracy-improved demographic impression distribution 126 to the estimated demographic impression distribution (P).

Alternatively, if the Lagrange multiplier change value (Δλ) is not acceptable, probability generator 502 updates the estimated demographic impression distribution (P) (block 816) and control returns to block 806. The demographic impression distribution determiner 124 may repeat blocks 806, 808, 810, 812, 814, and 816 to update the estimated demographic impression distribution (P) one or more until the Lagrange multiplier change value (Δλ) satisfies a threshold (e.g., is acceptable). In some examples disclosed herein, the probability generator 502 may update the estimated demographic impression distribution (P) additional times after the Lagrange multiplier change value (Δλ) satisfies a threshold (e.g., an additional update to generate the accuracy-improved demographic impression distribution 126. The example process of FIG. 8 ends, and control returns to a calling function or process such as the example process of FIG. 7.

Figure 9:
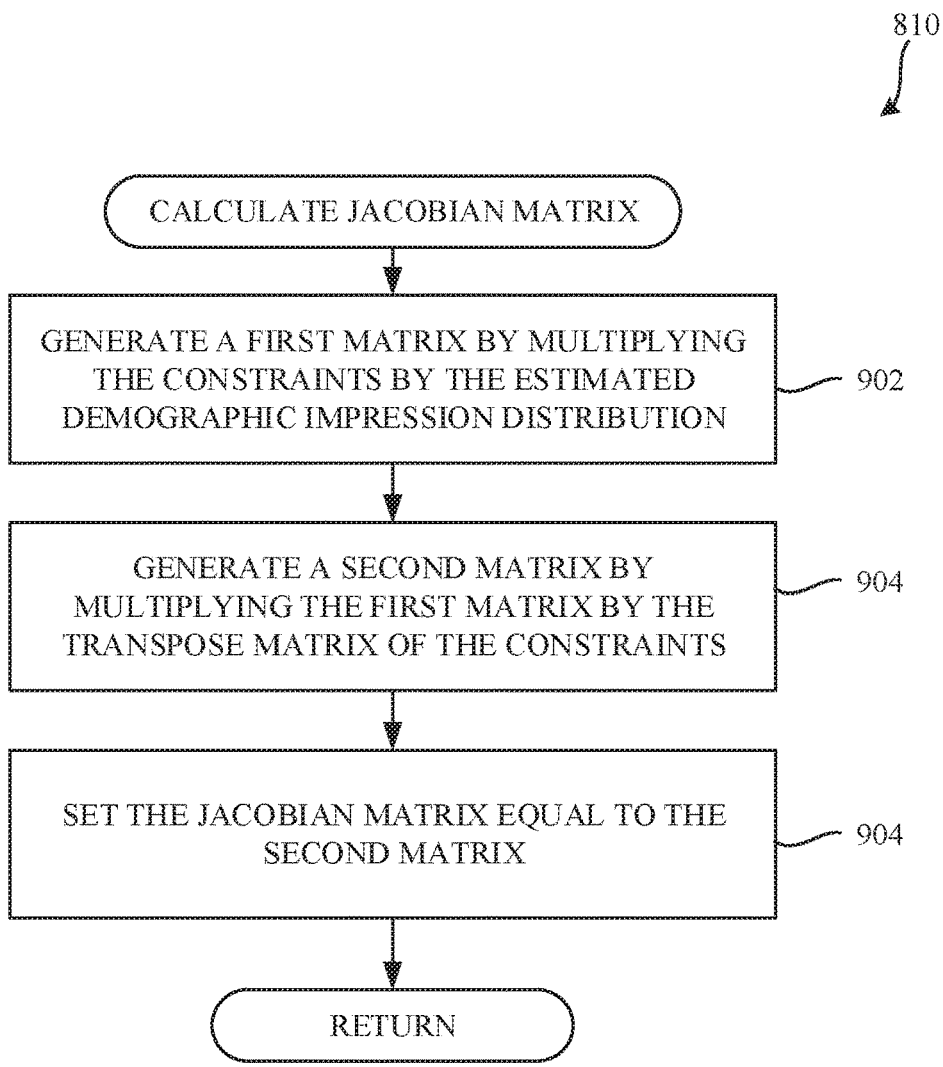
FIG. 9 is a flowchart representative of example machine readable instructions that may be executed to implement the matrix processor of FIG. 5 to determine a Jacobian Matrix to be used to determine an adjustment in the Lagrange multipliers.

FIG. 9 is a flowchart representative of example machine readable instructions that may be executed to implement the matrix processor 504 of FIG. 5 to determine a Jacobian Matrix (J). The example process of FIG. 9 may be used to implement block 810 of FIG. 8. In examples disclosed herein, the matrix processor 504 determines a first matrix by computing a linear combination of element-wise multiplication of a matrix including the constraints (C) (e.g., the constraints 510) and the estimated demographic impression distribution (P) (block 902). In some examples, the matrix processor 504 factors a weight (W) into the first matrix calculated by the matrix processor 504 at block 902. The example matrix processor 504 determines a second matrix in further segments by multiplying the first matrix by an additional matrix representative of the constraints (C) (e.g., a transpose matrix of the constraints 510) (block 904). The matrix processor 504 sets the Jacobian Matrix (J) equal to the second matrix (block 906). The example process of FIG. 9 ends, and control returns to a calling function or process such as the example process of FIG. 8.

Figure 10:
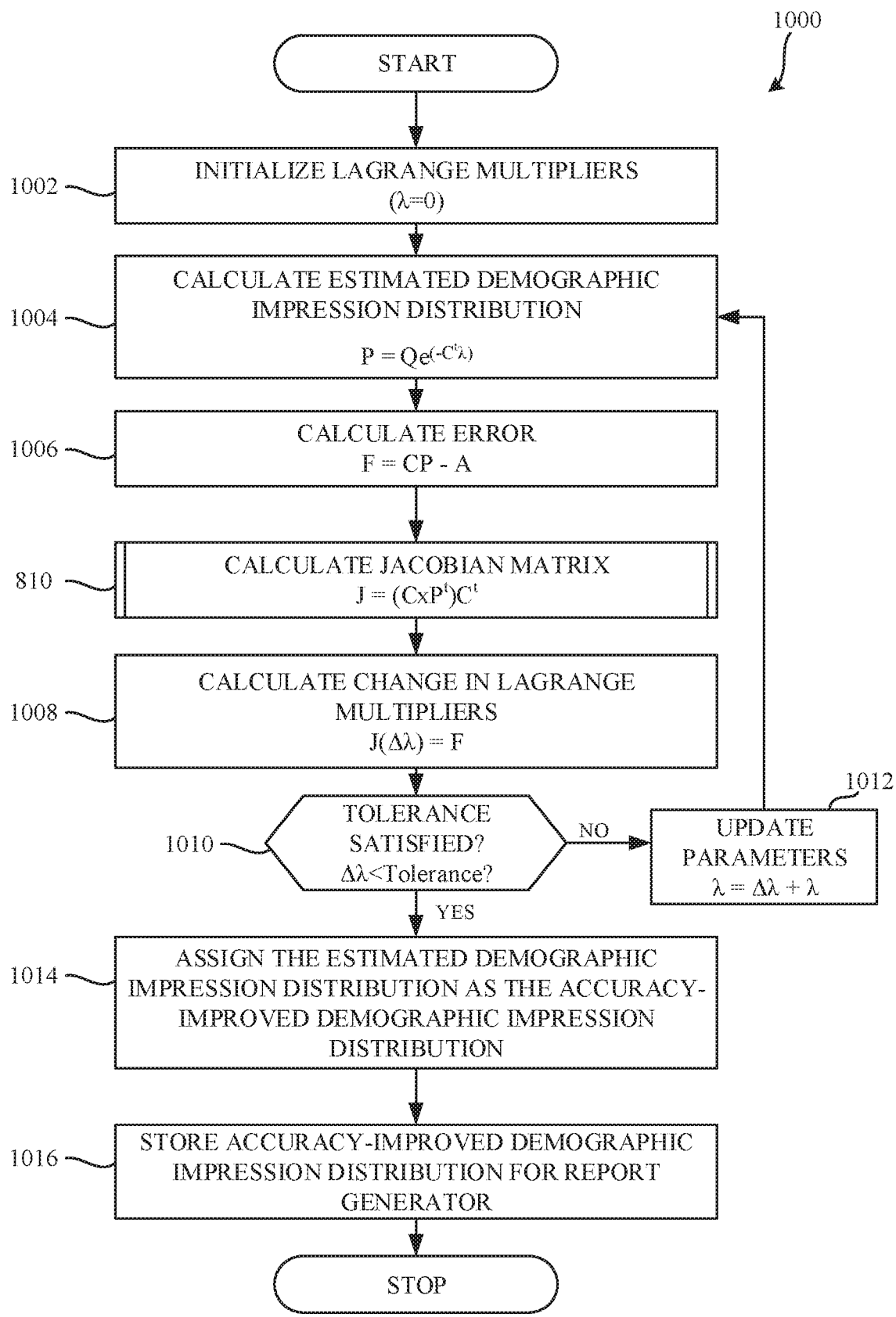
FIG. 10 is a flowchart representative of example machine readable instructions that may be executed to implement the demographic impression distribution determiner of FIGS. 1-3 and/or 5 to determine the example accuracy-improved demographic impression distribution of FIGS. 1 and/or 5.

FIG. 10 is a flowchart 1000 representative of example machine readable instructions that may be executed to implement the demographic impression distribution determiner 124 of FIGS. 1-3 and/or 5 to determine the example accuracy-improved demographic impression distribution 126 of FIGS. 1 and/or 5. The example probability generator 502 initializes the Lagrange multipliers (λ) (block 1002). In some examples disclosed herein, the probability generator 502 initializes the Lagrange multipliers (λ) to be zero, or any other numerical value. The example probability generator 502 calculates an estimated demographic impression distribution (P) (block 1004). For example, the probability generator 502 uses Equation 4 to generate the estimated demographic impression distribution (P) based on the impression data generated by the database proprietor server 106 of FIG. 1.

The example error determiner 506 calculates a compliance error (F) associated with the estimated demographic impression distribution (P) (block 1006). For example, the error determiner 506 determines the compliance error (F) using Equation 5 above. The example matrix processor 504 calculates a Jacobian Matrix (J) using a linear combination of the current estimate of the demographic impression distribution (P) and the constraint matrix (e.g., the constraints 510) (block 810). For example, the matrix processor 504 uses Equation 5 above to determine the Jacobian Matrix (J). In some examples, block 1008 may be implemented by the example process of FIG. 9. The example error determiner 506 calculates a Lagrange multiplier change value (Δλ) based on the Jacobian Matrix (J) (block 1008). For example, the error determiner 506 may calculate the Lagrange multiplier change value (Δλ) by multiplying the compliance error (F) by the inverse of the Jacobian Matrix (J) using Equation 7 above.

If the example error determiner 506 determines the Lagrange multiplier change value (Δλ) satisfies a threshold (block 1010), the probability generator 502 assigns the estimated demographic impression distribution (P) as the accuracy-improved demographic impression distribution 126 (block 1014). At block 1016, the probability generator 502 stores the accuracy-improved demographic impression distribution 126 in memory for access by the report generator 128 (FIGS. 1 and 5).

Alternatively, if the tolerance is not satisfied at block 1010, the demographic impression distribution determiner 124 updates the Lagrange multipliers (λ) (block 1012) and control returns to block 1004 to recalculate an updated estimated demographic impression distribution (P) (block 1004). In examples disclosed herein, the tolerance may be a value determined by the database proprietor server 106 and/or the audience measurement entity server 108.

Figure 11:
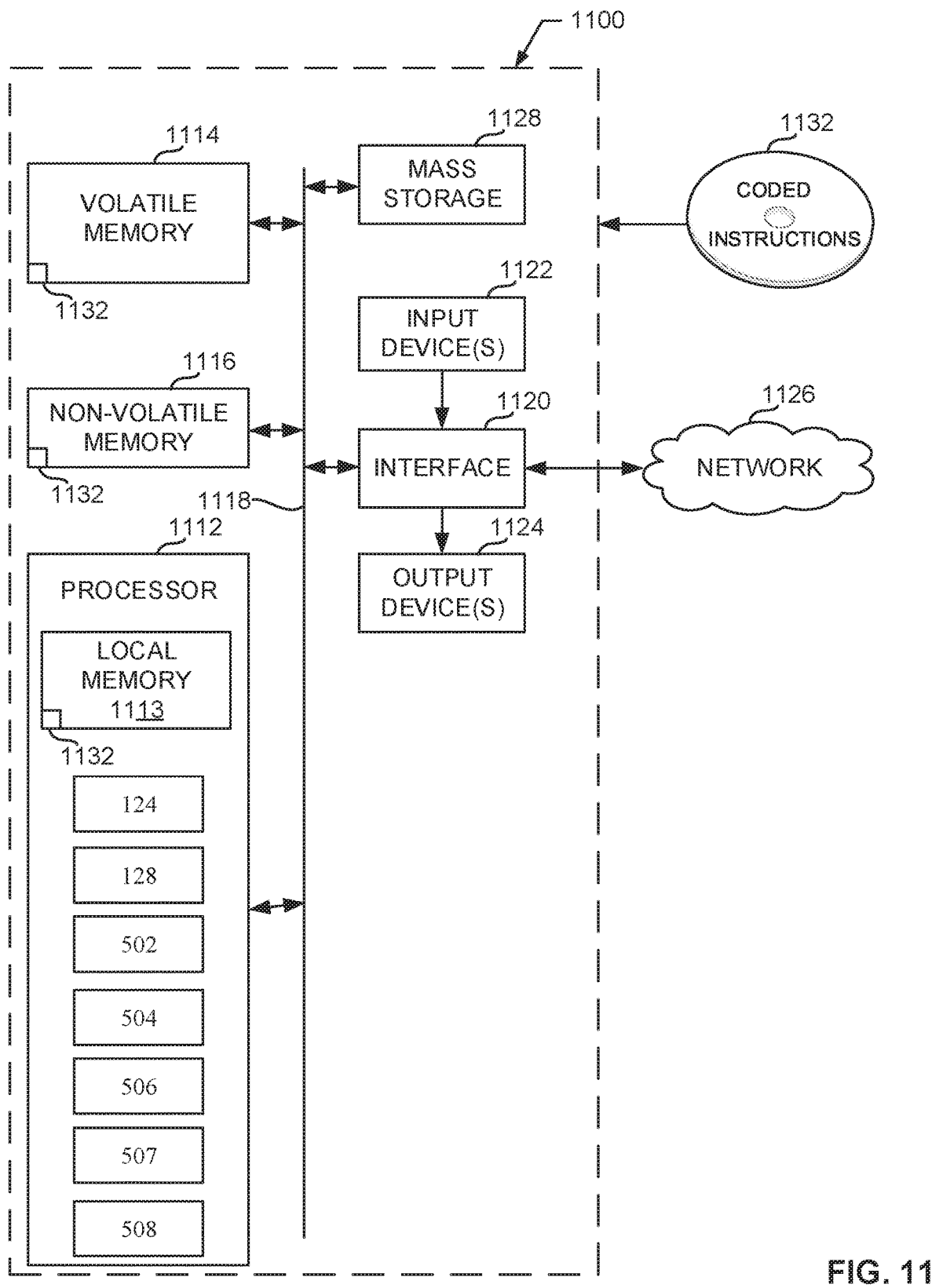
FIG. 11 is a block diagram of an example processor platform structured to execute the instructions of FIGS. 6-10 to implement the demographic impression distribution determiner of FIGS. 1-3 and/or 5 to determine an accuracy-improved demographic impression distribution.

FIG. 11 is a block diagram of an example processor platform 1100 structured to execute the instructions of FIGS. 7-10 to implement the demographic impression distribution determiner 124 of FIGS. 1, 5. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example probability generator 502, the example matrix processor 504, the example error determiner 506, the example comparator 507, the example constraint generator 508, the example report generator 128, and/or, more generally, the example demographic impression distribution determiner 124 of FIGS. 1-3 and 5.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC) interface, and/or a PCI express interface.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and digital versatile disk (DVD) drives.

The machine executable instructions 1132 of FIGS. 7-10 may be stored in the mass storage device 1128, in the volatile memory 1114, in the non-volatile memory 1116, and/or on a removable non-transitory computer readable storage medium such as a CD or DVD.

Examples disclosed above are not limited to generating accuracy-improved demographic impression distributions for audience members across varying demographic segments. Examples disclosed herein may be used to update inaccurate and/or incorrect estimated probabilities subject to background information, constraints, and/or incorporated weights. For example, inaccurate and/or incorrect probability distributions of total people that visit stores (e.g., restaurants, commercial retail sites, malls, etc.) may be corrected. In such example, the probability is distributed across regions cities, states, countries, etc.), the members in the distribution may be people, and the total number of visits entering the stores) may be measured. Alternatively, examples disclosed herein may be used to update non-response records to match prior known total response records. In such examples, response records may be a survey of items purchased, therefore, examples disclosed herein may correct probabilities distributed across a number of items purchased for a total number of purchasers. In addition, examples disclosed herein may be used to estimate demographic profiles of households given different regional constraints and known census totals.

Examples disclosed above may be used to determine a probability distribution across varying demographic profiles. The demographic profiles are mutually exclusive groups that partition a set of individuals, items, places, etc. Examples disclosed herein may have weights for each partition of individuals, items, places, etc., depending on prior known totals of such partition.

From the foregoing, it will be appreciated that example methods, apparatus and articles of manufacture have been disclosed that update an incorrect and/or inaccurate demographic impression distribution generated by a server. The disclosed methods, apparatus and articles of manufacture improve the efficiency of using a computing device by computing the Jacobian Matrix using less processing resources by executing less instruction cycles than used in prior methods. The disclosed methods, apparatus and articles of manufacture improve the efficiency of using a computing device by incorporating a normalization constraint explicitly in the constraints to handle multiple probability distributions simultaneously. Additionally, examples disclosed herein include even constraints across the probability distributions, thus for example, can solve for two probability distributions in which a small number of probabilities are known, but not the individual components. The disclosed methods, apparatus, and articles of manufacture can estimate any number of probability distributions, each including a different number of probabilities and only known constraints across them, and/or estimate a probability distribution in which the only prior knowledge is one probability. Therefore, the disclosed methods, apparatus and articles of manufacture can solve for fewer probabilities than actually existing. Additionally, the disclosed methods, apparatus and articles of manufacture improve the efficiency by allocating less memory to compute the Jacobin Matrix and correcting incorrect probability data. Furthermore, disclosed methods, apparatus and articles of manufacture improve the efficiency of a computing device by computing the Jacobian Matrix faster and more efficiently, using linear combinations to reduce the overhead used in computing the Jacobian Matrix. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following examples are in accordance with teachings of this disclosure.

Example 1 is an apparatus including an impressions collector to log a plurality of impressions at a first server of a first entity based on receiving a plurality of first network communications at the first server of the first entity from first client devices and second client devices, the impressions indicative of accesses to media; instruct the second client devices, via redirect network communications, to send third network communications to a second server of a database proprietor, the third network communications to be indicative of the accesses to the media at the second client devices; generate a reference demographic impression distribution based on ones of the logged impressions at the first server corresponding to the first client devices, the reference demographic impression distribution representative of reference impression counts distributed across different demographic segments; and access an inaccurate demographic impression distribution generated by the second server of the database proprietor, the inaccurate demographic impression distribution corresponding to second impressions logged by the second server based on the third network communications, and the inaccurate demographic impression distribution representative of first impression counts distributed across the different demographic segments. The apparatus of Example 1 also includes a probability generator to determine an estimated demographic impression distribution based on the inaccurate demographic impression distribution, the estimated demographic impression distribution representative of second impression counts distributed across the different demographic segments. The apparatus of Example 1 also includes a matrix processor in circuit with the probability generator, the matrix processor to determine a first matrix representative of element-wise multiplication between a constraint matrix and a first transpose matrix of the estimated demographic impression distribution, the constraint matrix based on the reference demographic impression distribution, and determine a second matrix by multiplying the first matrix with a second transpose matrix of the constraint matrix. The apparatus of Example 1 also includes an error determiner in circuit with the matrix processor, the error determiner to determine an error indicator value based on the second matrix, the error indicator value indicative of an error associated with the estimated demographic impression distribution, the probability generator to generate, in response to the error indicator value satisfying a threshold, an accuracy-improved demographic impression distribution. The apparatus of Example 1 also includes a memory to store the accuracy-improved demographic impression distribution in a memory to improve an accuracy of the second server corresponding to the inaccurate demographic impression distribution.

In Example 2, the subject matter of Example 1 can optionally include that the plurality of impressions logged at the first server are based on audience members identifiable by the first server and based on corresponding audience member demographics.

In Example 3, the subject matter of any one or more of Examples 1-2 can optionally include that the second client devices include database proprietor identifiers recognizable by the second server of the database proprietor.

In Example 4, the subject matter of any one or more of Examples 1-3 can optionally include that the accuracy-improved demographic impression distribution represents an updated demographic impression distribution based on the estimated demographic impression distribution and the constraint matrix.

In Example 5, the subject matter of any one or more of Examples 1-4 can optionally include that the probability generator determines the estimated demographic impression distribution based on a weight.

In Example 6, the subject matter of any one or more of Examples 1-5 can optionally include that the weight is representative of a number of audience members using at least some of the second client devices.

In Example 7, the subject matter of any one or more of Examples 1-6 can optionally include that the matrix processor is to apply a weight to the estimated demographic impression distribution to determine the first matrix, the weight representative of a number of audience members using at least some of the second client devices.

In Example 8, the subject matter of any one or more of Examples 1-7 can optionally include that the probability generator is to, in response to the error determiner determining the error indicator value does not satisfy the threshold, generate a plurality of second estimated demographic impression distributions until the error determiner determines a second error indicator value corresponding to one of the second estimated demographic impression distributions that satisfies the threshold.

In Example 9, the subject matter of any one or more of Examples 1-8 can optionally include that the constraint matrix is representative of numerical impression limits for use in modeling the inaccurate demographic impression distribution.

In Example 10, the subject matter of any one or more of Examples 1-9 can optionally include that the error indicator value represents that there is a compliance error between constraint limits and a matrix in which the constraint matrix is multiplied by the estimated demographic impression distribution.

In Example 11, the subject matter of any one or more of Examples 1-10 can optionally include that the error indicator value is a Lagrange multiplier change value.

Example 12 is a method that includes: logging a plurality of impressions at a first server of a first entity based on receiving a plurality of first network communications at the first server of the first entity from first client devices and second client devices, the impressions indicative of accesses to media; instructing the second client devices, via redirect network communications, to send third network communications to a second server of a database proprietor, the third network communications to be indicative of the accesses to the media at the second client devices; generating a reference demographic impression distribution based on ones of the logged impressions at the first server corresponding to the first client devices, the reference demographic impression distribution representative of reference impression counts distributed across different demographic segments; accessing an inaccurate demographic impression distribution generated by the second server of the database proprietor, the inaccurate demographic impression distribution corresponding to second impressions logged by the second server based on the third network communications, and the inaccurate demographic impression distribution representative of first impression counts distributed across the different demographic segments; determining an estimated demographic impression distribution based on the inaccurate demographic impression distribution, the estimated demographic impression distribution representative of second impression counts distributed across the different demographic segments; determining a first matrix representative of element-wise multiplication between a constraint matrix and a first transpose matrix of the estimated demographic impression distribution, the constraint matrix based on the reference demographic impression distribution; determining a second matrix by multiplying the first matrix with a second transpose matrix of the constraint matrix; determining an error indicator value based on the second matrix, the error indicator value indicative of an error associated with the estimated demographic impression distribution, generating; in response to the error indicator value satisfying a threshold, an accuracy-improved demographic impression distribution; and storing the accuracy-improved demographic impression distribution in a memory to improve an accuracy of the second server corresponding to the inaccurate demographic impression distribution.

In Example 13, the subject matter of Example 12 can optionally include that the plurality of impressions logged at the first server are based on audience members identifiable by the first server and based on corresponding audience member demographics.

In Example 14, the subject matter of any one or more of Examples 12-13 can optionally include that the second client devices include database proprietor identifiers recognizable by the second server of the database proprietor.

In Example 15, the subject matter of any one or more of Examples 12-14 can optionally include that the accuracy-improved demographic impression distribution represents an updated demographic impression distribution based on the estimated demographic impression distribution and the constraint matrix.

In Example 16, the subject matter of any one or more of Examples 12-15 can optionally include determining the estimated demographic impression distribution based on a weight.

In Example 17, the subject matter of any one or more of Examples 12-16 can optionally include that the weight is representative of a number of audience members using at least some of the second client devices.

In Example 18, the subject matter of any one or more of Examples 12-17 can optionally include applying a weight to the estimated demographic impression distribution to determine the first matrix, the weight representative of a number of audience members using at least some of the second client devices.

In Example 19, the subject matter of any one or more of Examples 12-18 can optionally include, in response to the error indicator value not satisfying the threshold, generating a plurality of second estimated demographic impression distributions until the error determiner determines a second error indicator value corresponding to one of the second estimated demographic impression distributions that satisfies the threshold.

In Example 20, the subject matter of any one or more of Examples 12-19 can optionally include that the constraint matrix is representative of numerical impression limits for use in modeling the inaccurate demographic impression distribution.

In Example 21, the subject matter of any one or more of Examples 12-20 can optionally include that the error indicator value represents that there is a compliance error between constraint limits and a matrix in which the constraint matrix is multiplied by the estimated demographic impression distribution.

In Example 22, the subject matter of any one or more of Examples 12-21 can optionally include that the error indicator value is a Lagrange multiplier change value.

Example 23 is a non-transitory computer readable medium comprising computer readable instructions which, when executed, cause a processor to at least: log a plurality of impressions at a first server of a first entity based on receiving a plurality of first network communications at the first server of the first entity from first client devices and second client devices, the impressions indicative of accesses to media; instruct the second client devices, via redirect network communications, to send third network communications to a second server of a database proprietor, the third network communications to be indicative of the accesses to the media at the second client devices; generate a reference demographic impression distribution based on ones of the logged impressions at the first server corresponding to the first client devices, the reference demographic impression distribution representative of reference impression counts distributed across different demographic segments; access an inaccurate demographic impression distribution generated by the second server of the database proprietor, the inaccurate demographic impression distribution corresponding to second impressions logged by the second server based on the third network communications, and the inaccurate demographic impression distribution representative of first impression counts distributed across the different demographic segments; determine an estimated demographic impression distribution based on the inaccurate demographic impression distribution, the estimated demographic impression distribution representative of second impression counts distributed across the different demographic segments; determine a first matrix representative of element-wise multiplication between a constraint matrix and a first transpose matrix of the estimated demographic impression distribution, the constraint matrix based on the reference demographic impression distribution; determine a second matrix by multiplying the first matrix with a second transpose matrix of the constraint matrix; determine an error indicator value based on the second matrix, the Lagrange multiplier change value indicative of an error associated with the estimated demographic impression distribution; generate, in response to the error indicator value satisfying a threshold, an accuracy-improved demographic impression distribution; and store the accuracy-improved demographic impression distribution in a memory to improve an accuracy of the second server corresponding to the inaccurate demographic impression distribution.

In Example 24, the subject matter of Example 23 can optionally include that the plurality of impressions logged at the first server are based on audience members identifiable by the first server and based on corresponding audience member demographics.

In Example 25, the subject matter of any one or more of Examples 23-24 can optionally include that the second client devices include database proprietor identifiers recognizable by the second server of the database proprietor.

In Example 26, the subject matter of any one or more of Examples 23-25 can optionally include that the accuracy-improved demographic impression distribution represents an updated demographic impression distribution based on the estimated demographic impression distribution and the constraint matrix.

In Example 27, the subject matter of any one or more of Examples 23-26 can optionally include that the instructions are to cause the processor to determine the estimated demographic impression distribution based on a weight.

In Example 28, the subject matter of any one or more of Examples 23-27 can optionally include that the weight is representative of a number of audience members using at least some of the second client devices.

In Example 29, the subject matter of any one or more of Examples 23-28 can optionally include that the instructions are further to cause the processor to apply a weight to the estimated demographic impression distribution to determine the first matrix, the weight representative of a number of audience members using at least some of the second client devices.

In Example 30, the subject matter of any one or more of Examples 23-29 can optionally include that the instructions are further to cause the processor to, in response to determining the error indicator value does not satisfy the threshold, generate a plurality of second estimated demographic impression distributions until the error determiner determines a second error indicator value corresponding to one of the second estimated demographic impression distributions that satisfies the threshold.

In Example 31, the subject matter of any one or more of Examples 23-30 can optionally include that the constraint matrix is representative of numerical impression limits for use in modeling the inaccurate demographic impression distribution.

In Example 32, the subject matter of any one or more of Examples 23-31 can optionally include that the error indicator value represents that there is a compliance error between constraint limits and a matrix in which the constraint matrix is multiplied by the estimated demographic impression distribution.

In Example 33, the subject matter of any one or more of Examples 23-32 can optionally include that the error indicator value is a Lagrange multiplier change value.

What is claimed is:

1. An apparatus comprising:
    an impressions collector to:
        log a plurality of impressions at a first server of a first entity based on receiving a plurality of first network communications at the first server of the first entity from first client devices and second client devices, the impressions indicative of accesses to media;
        instruct the second client devices, via redirect network communications, to send third network communications to a second server of a database proprietor, the third network communications to be indicative of the accesses to the media at the second client devices;
        generate a reference demographic impression distribution based on ones of the logged impressions at the first server corresponding to the first client devices, the reference demographic impression distribution representative of reference impression counts distributed across different demographic segments; and
        access an inaccurate demographic impression distribution generated by the second server of the database proprietor, the inaccurate demographic impression distribution corresponding to second impressions logged by the second server based on the third network communications, and the inaccurate demographic impression distribution representative of first impression counts distributed across the different demographic segments;
    a probability generator to determine an estimated demographic impression distribution based on the inaccurate demographic impression distribution, the estimated demographic impression distribution representative of second impression counts distributed across the different demographic segments;
    a matrix processor in circuit with the probability generator, the matrix processor to:
        determine a first matrix representative of element-wise multiplication between a constraint matrix and a first transpose matrix of the estimated demographic impression distribution, the constraint matrix based on the reference demographic impression distribution; and
        determine a second matrix by multiplying the first matrix with a second transpose matrix of the constraint matrix;
    an error determiner in circuit with the matrix processor, the error determiner to determine an error indicator value based on the second matrix, the error indicator value indicative of an error associated with the estimated demographic impression distribution;
    the probability generator to generate, in response to the error indicator value satisfying a threshold, an accuracy-improved demographic impression distribution; and
    a memory to store the accuracy-improved demographic impression distribution in a memory to improve an accuracy of the second server corresponding to the inaccurate demographic impression distribution.

2. The apparatus of claim 1, wherein the plurality of impressions logged at the first server are based on audience members identifiable by the first server and based on corresponding audience member demographics.

3. The apparatus of claim 1, wherein the second client devices include database proprietor identifiers recognizable by the second server of the database proprietor.

4. The apparatus of claim 1, wherein the accuracy-improved demographic impression distribution represents an updated demographic impression distribution based on the estimated demographic impression distribution and the constraint matrix.

5. The apparatus of claim 1, wherein the probability generator determines the estimated demographic impression distribution based on a weight.

6. The apparatus of claim 5, wherein the weight is representative of a number of audience members using at least some of the second client devices.

7. The apparatus of claim 1, wherein the matrix processor is to apply a weight to the estimated demographic impression distribution to determine the first matrix, the weight representative of a number of audience members using at least some of the second client devices.

8. The apparatus of claim 1, wherein the probability generator is to, in response to the error determiner determining the error indicator value does not satisfy the threshold, generate a plurality of second estimated demographic impression distributions until the error determiner determines a second error indicator value corresponding to one of the second estimated demographic impression distributions that satisfies the threshold.

9. The apparatus of claim 1, wherein the constraint matrix is representative of numerical impression limits for use in modeling the inaccurate demographic impression distribution.

10. The apparatus of claim 1, wherein the error indicator value represents that there is a compliance error between constraint limits and a matrix in which the constraint matrix is multiplied by the estimated demographic impression distribution.

11. The apparatus of claim 1, wherein the error indicator value is a Lagrange multiplier change value.

12. A method comprising:
    logging a plurality of impressions at a first server of a first entity based on receiving a plurality of first network communications at the first server of the first entity from first client devices and second client devices, the impressions indicative of accesses to media;
    instructing the second client devices, via redirect network communications, to send third network communications to a second server of a database proprietor, the third network communications to be indicative of the accesses to the media at the second client devices;
    generating a reference demographic impression distribution based on ones of the logged impressions at the first server corresponding to the first client devices, the reference demographic impression distribution representative of reference impression counts distributed across different demographic segments;

accessing an inaccurate demographic impression distribution generated by the second server of the database proprietor, the inaccurate demographic impression distribution corresponding to second impressions logged by the second server based on the third network communications, and the inaccurate demographic impression distribution representative of first impression counts distributed across the different demographic segments;

determining an estimated demographic impression distribution based on the inaccurate demographic impression distribution, the estimated demographic impression distribution representative of second impression counts distributed across the different demographic segments;

determining a first matrix representative of element-wise multiplication between a constraint matrix and a first transpose matrix of the estimated demographic impression distribution, the constraint matrix based on the reference demographic impression distribution;

determining a second matrix by multiplying the first matrix with a second transpose matrix of the constraint matrix;

determining an error indicator value based on the second matrix, the error indicator value indicative of an error associated with the estimated demographic impression distribution;

generating, in response to the error indicator value satisfying a threshold, an accuracy-improved demographic impression distribution; and storing the accuracy-improved demographic impression distribution in a memory to improve an accuracy of the second server corresponding to the inaccurate demographic impression distribution.

13. The method of claim 12, wherein the plurality of impressions logged at the first server are based on audience members identifiable by the first server and based on corresponding audience member demographics.

14. The method of claim 12, wherein the second client devices include database proprietor identifiers recognizable by the second server of the database proprietor.

15. The method of claim 12, wherein the accuracy-improved demographic impression distribution represents an updated demographic impression distribution based on the estimated demographic impression distribution and the constraint matrix.

16. The method of claim 12, further including determining the estimated demographic impression distribution based on a weight.

17. The method of claim 16, wherein the weight is representative of a number of audience members using at least some of the second client devices.

18. The method of claim 12, further including applying a weight to the estimated demographic impression distribution to determine the first matrix, the weight representative of a number of audience members using at least some of the second client devices.

19. The method of claim 12, further including, in response to the error indicator value not satisfying the threshold, generating a plurality of second estimated demographic impression distributions until a second error indicator value corresponding to one of the second estimated demographic impression distributions satisfies the threshold.

20. The method of claim 12, wherein the constraint matrix is representative of numerical impression limits for use in modeling the inaccurate demographic impression distribution.

21. The method of claim 12, wherein the error indicator value represents that there is a compliance error between constraint limits and a matrix in which the constraint matrix is multiplied by the estimated demographic impression distribution.

22. The method of claim 12, wherein the error indicator value is a Lagrange multiplier change value.

23. A non-transitory computer readable medium comprising computer readable instructions which, when executed, cause a processor to at least:

log a plurality of impressions at a first server of a first entity based on receiving a plurality of first network communications at the first server of the first entity from first client devices and second client devices, the impressions indicative of accesses to media;

instruct the second client devices, via redirect network communications, to send third network communications to a second server of a database proprietor, the third network communications to be indicative of the accesses to the media at the second client devices;

generate a reference demographic impression distribution based on ones of the logged impressions at the first server corresponding to the first client devices, the reference demographic impression distribution representative of reference impression counts distributed across different demographic segments;

access an inaccurate demographic impression distribution generated by the second server of the database proprietor, the inaccurate demographic impression distribution corresponding to second impressions logged by the second server based on the third network communications, and the inaccurate demographic impression distribution representative of first impression counts distributed across the different demographic segments;

determine an estimated demographic impression distribution based on the inaccurate demographic impression distribution, the estimated demographic impression distribution representative of second impression counts distributed across the different demographic segments;

determine a first matrix representative of element-wise multiplication between a constraint matrix and a first transpose matrix of the estimated demographic impression distribution, the constraint matrix based on the reference demographic impression distribution;

determine a second matrix by multiplying the first matrix with a second transpose matrix of the constraint matrix;

determine an error indicator value based on the second matrix, the error indicator value indicative of an error associated with the estimated demographic impression distribution;

generate, in response to the error indicator value satisfying a threshold, an accuracy-improved demographic impression distribution; and store the accuracy-improved demographic impression distribution in a memory to improve an accuracy of the second server corresponding to the inaccurate demographic impression distribution.

24. The computer readable medium of claim 23, wherein the plurality of impressions logged at the first server are based on audience members identifiable by the first server and based on corresponding audience member demographics.

25. The computer readable medium of claim 23, wherein the second client devices include database proprietor identifiers recognizable by the second server of the database proprietor.

26. The computer readable medium of claim 23, wherein the accuracy-improved demographic impression distribution represents an updated demographic impression distribution based on the estimated demographic impression distribution and the constraint matrix.

27. The computer readable medium of claim 23, wherein the instructions are to cause the processor to determine the estimated demographic impression distribution based on a weight.

28. The computer readable medium of claim 27, wherein the weight is representative of a number of audience members using at least some of the second client devices.

29. The computer readable medium of claim 23, wherein the instructions are further to cause the processor to apply a weight to the estimated demographic impression distribution to determine the first matrix, the weight representative of a number of audience members using at least some of the second client devices.

30. The computer readable medium of claim 23, wherein the instructions are further to cause the processor to, in response to determining the error indicator value does not satisfy the threshold, generate a plurality of second estimated demographic impression distributions until the processor determines a second error indicator value corresponding to one of the second estimated demographic impression distributions that satisfies the threshold.

31. The computer readable medium of claim 23, wherein the constraint matrix is representative of numerical impression limits for use in modeling the inaccurate demographic impression distribution.

32. The computer readable medium of claim 23, wherein the error indicator value represents that there is a compliance error between constraint limits and a matrix in which the constraint matrix is multiplied by the estimated demographic impression distribution.

33. The computer readable medium of claim 23, wherein the error indicator value is a Lagrange multiplier change value.

* * * * *